(12) United States Patent
Oba

(10) Patent No.: US 11,034,296 B2
(45) Date of Patent: Jun. 15, 2021

(54) IMAGE DISPLAY DEVICE, IMAGE DISPLAY METHOD, AND MOVING OBJECT

(71) Applicant: Sony Corporation, Tokyo (JP)

(72) Inventor: Eiji Oba, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 16/092,863

(22) PCT Filed: Mar. 2, 2017

(86) PCT No.: PCT/JP2017/008249
§ 371 (c)(1),
(2) Date: Oct. 11, 2018

(87) PCT Pub. No.: WO2017/183322
PCT Pub. Date: Oct. 26, 2017

(65) Prior Publication Data
US 2019/0126824 A1    May 2, 2019

(30) Foreign Application Priority Data

Apr. 18, 2016 (JP) .............................. JP2016-082621

(51) Int. Cl.
*B60R 1/00* (2006.01)
*E05F 15/70* (2015.01)
(Continued)

(52) U.S. Cl.
CPC ................ *B60R 1/00* (2013.01); *E05F 15/70* (2015.01); *G02B 27/0093* (2013.01); *G02B 27/0101* (2013.01); *H04N 5/247* (2013.01); *H04N 21/4316* (2013.01); *H04N 21/47* (2013.01); *B60J 1/12* (2013.01); *B60R 2300/105* (2013.01);
(Continued)

(58) Field of Classification Search
CPC .... B60J 1/00; B60J 1/17; B60K 35/00; B60R 11/02; B60R 1/08; E05F 15/70
See application file for complete search history.

(56) References Cited

U.S. PATENT DOCUMENTS 8,461,970 B2   6/2013  Birkemeyer et al.
2005/0273219 A1* 12/2005 Kitao ................. B60R 25/1012
                                                                701/2
(Continued)

FOREIGN PATENT DOCUMENTS

CN          204774932 U     11/2015
DE    10 2006 050 016 A1    4/2008
(Continued)

OTHER PUBLICATIONS

International Preliminary Report on Patentability dated Nov. 1, 2018 in connection with International Application No. PCT/JP2017/008249.

(Continued)

*Primary Examiner* — Dramos Kalapodas
(74) *Attorney, Agent, or Firm* — Wolf, Greenfield & Sacks, P.C.

(57) ABSTRACT

Provided is an image display device including: a display unit configured to display an image on a side window of a vehicle; and a control unit configured to control an opening and closing motion of the side window, according to a display state of the display unit.

24 Claims, 16 Drawing Sheets

(51) Int. Cl.
- *H04N 21/47* (2011.01)
- *H04N 21/431* (2011.01)
- *G02B 27/00* (2006.01)
- *G02B 27/01* (2006.01)
- *H04N 5/247* (2006.01)
- *B60J 1/12* (2006.01)

(52) U.S. Cl.
CPC ... *B60R 2300/202* (2013.01); *B60R 2300/205* (2013.01); *B60R 2300/303* (2013.01); *B60R 2300/802* (2013.01); *B60R 2300/8046* (2013.01); *E05Y 2900/55* (2013.01); *G02B 2027/014* (2013.01); *G02B 2027/0118* (2013.01); *G02B 2027/0138* (2013.01)

(56) References Cited

U.S. PATENT DOCUMENTS

| | | | | |
|---|---|---|---|---|
| 2008/0024463 | A1* | 1/2008 | Pryor | B60K 35/00 345/175 |
| 2008/0048932 | A1 | 2/2008 | Yanagisawa | |
| 2012/0069184 | A1* | 3/2012 | Hottmann | B60R 1/00 348/148 |
| 2014/0309870 | A1* | 10/2014 | Ricci | G05D 1/0016 701/36 |
| 2016/0070527 | A1* | 3/2016 | Ricci | G06F 3/165 715/716 |
| 2016/0123741 | A1* | 5/2016 | Mountain | H04N 5/44 701/533 |
| 2016/0137129 | A1* | 5/2016 | Mawhinney | B60R 1/006 348/148 |
| 2016/0257252 | A1* | 9/2016 | Zaitsev | G06K 9/00832 |
| 2017/0124987 | A1* | 5/2017 | Kim | B60R 11/04 |
| 2018/0105101 | A1* | 4/2018 | Tatara | F21S 43/20 |

FOREIGN PATENT DOCUMENTS

| | | | |
|---|---|---|---|
| DE | 102006050016 A1 | | 4/2008 |
| JP | 2000-046521 A | | 2/2000 |
| JP | 2000-071877 A | | 3/2000 |
| JP | 2007-008382 A | | 1/2007 |
| JP | 2007008382 A | * | 1/2007 |
| JP | 2007-052719 A | | 3/2007 |
| JP | 2007-196844 A | | 8/2007 |
| JP | 2007-304712 A | | 11/2007 |
| JP | 2010-006092 A | | 1/2010 |
| JP | 2010006092 A | * | 1/2010 |
| JP | 2011-021318 A | | 2/2011 |
| JP | 2011-213186 A | | 10/2011 |
| JP | 2011213186 A | * | 10/2011 |
| JP | 2015-049842 A | | 3/2015 |
| JP | 2015-116902 A | | 6/2015 |
| JP | 2015-174643 A | | 10/2015 |
| JP | 2015-232859 A | | 12/2015 |
| WO | WO 2013/191085 A1 | | 12/2013 |
| WO | WO 2015/041106 A1 | | 3/2015 |
| WO | WO 2005/124431 A1 | | 12/2015 |

OTHER PUBLICATIONS

International Search Report and Written Opinion dated May 15, 2017 in connection with International Application No. PCT/JP2017/008249.

Japanese Office Action dated Oct. 1, 2019 in connection with Japanese Application No. 2016-082621 and English translation thereof.

Japanese Office Action dated Jan. 7, 2020 in connection with Japanese Application No. 2016-082621, and English translation thereof.

Japanese Office Action dated Jul. 7, 2020 in connection with Japanese Application No. 2016-082621 and English translation thereof.

* cited by examiner

[Fig. 1]
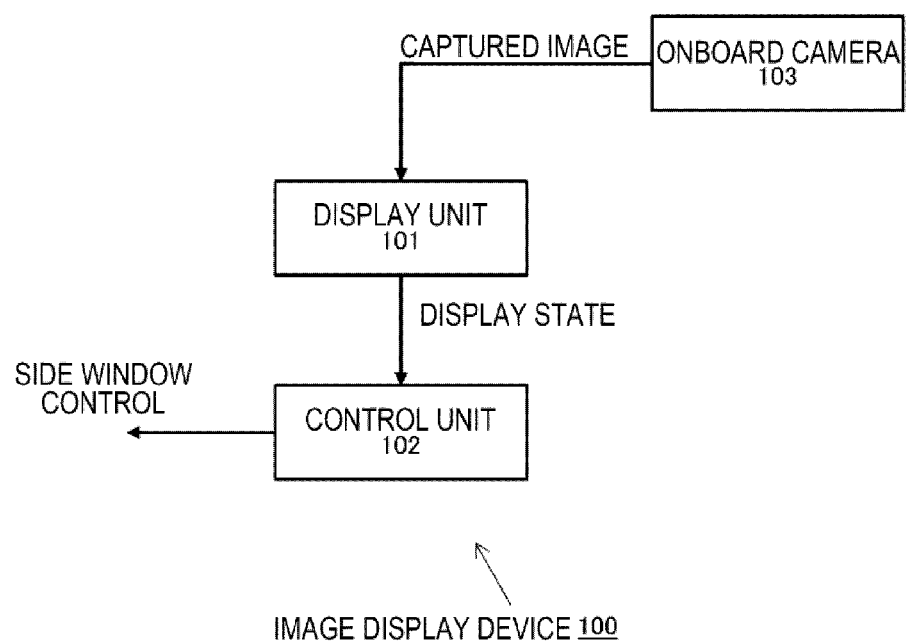

[Fig. 2]
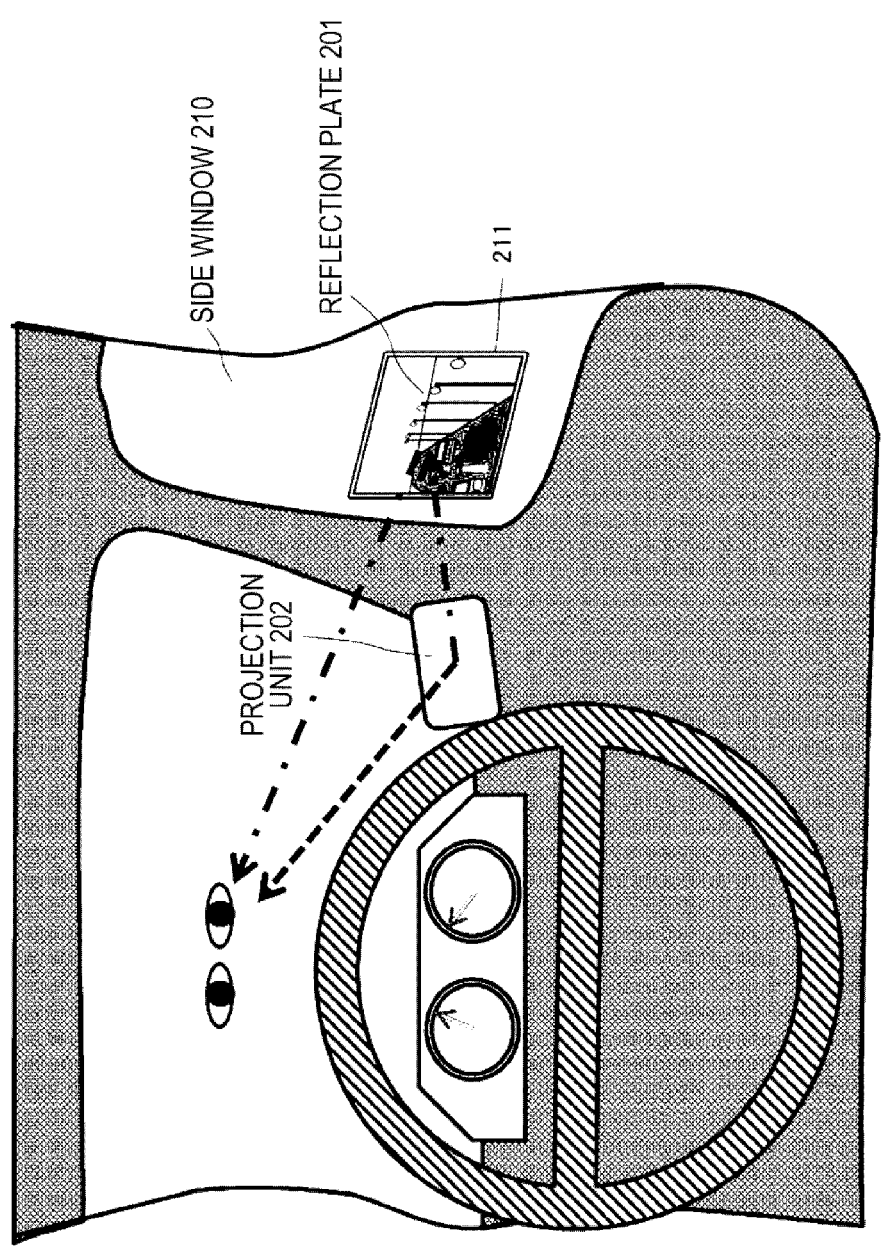

[Fig. 3]
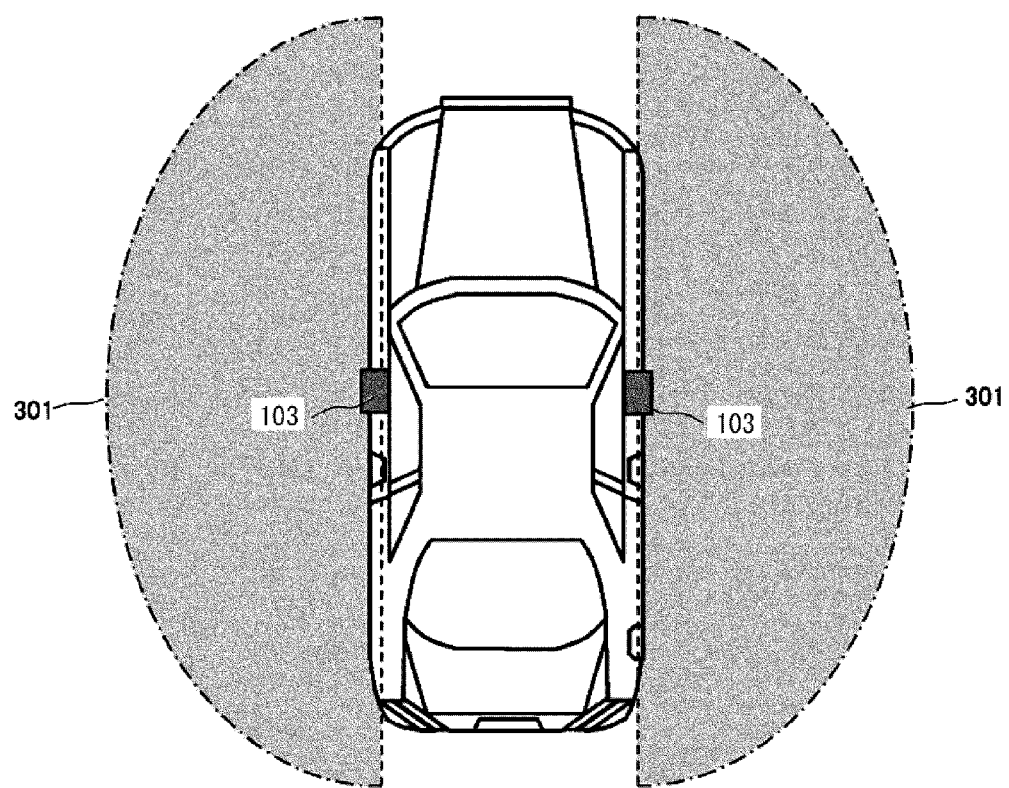

[Fig. 4]
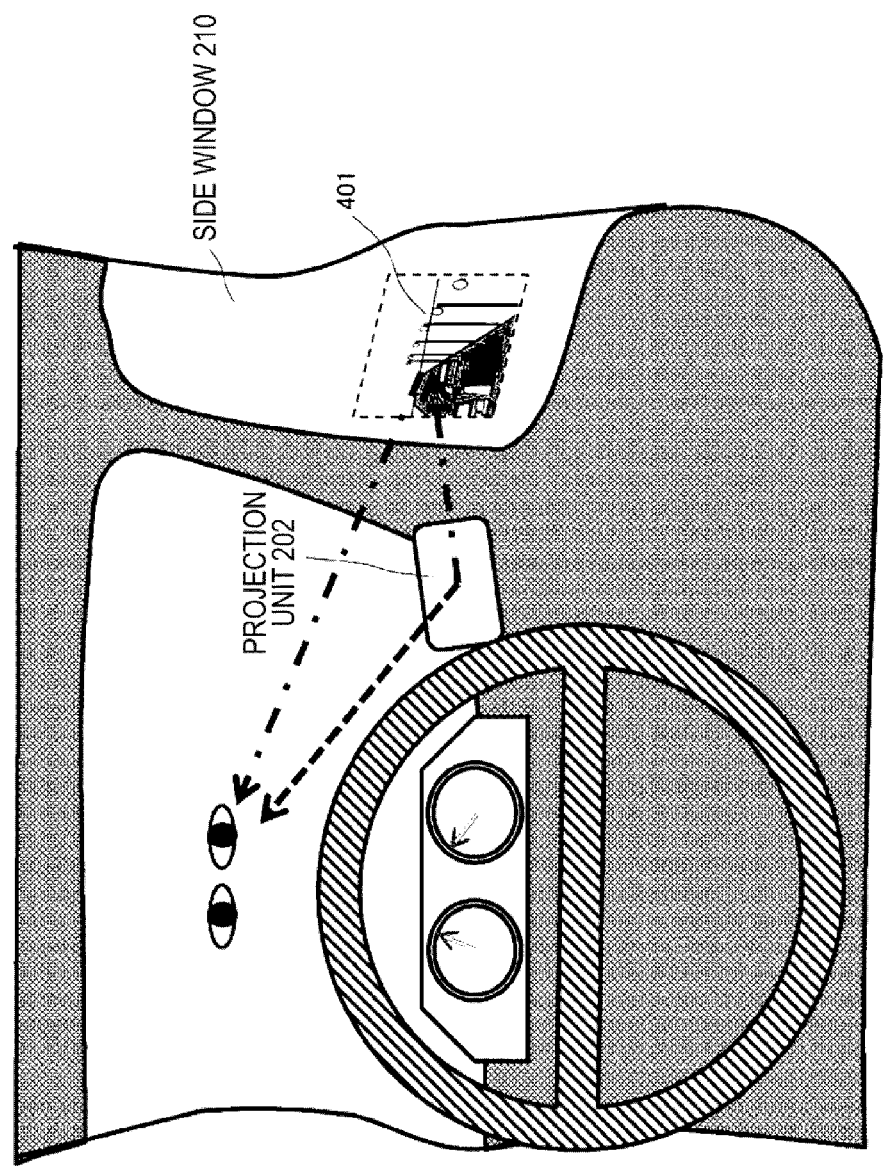

[Fig. 5]
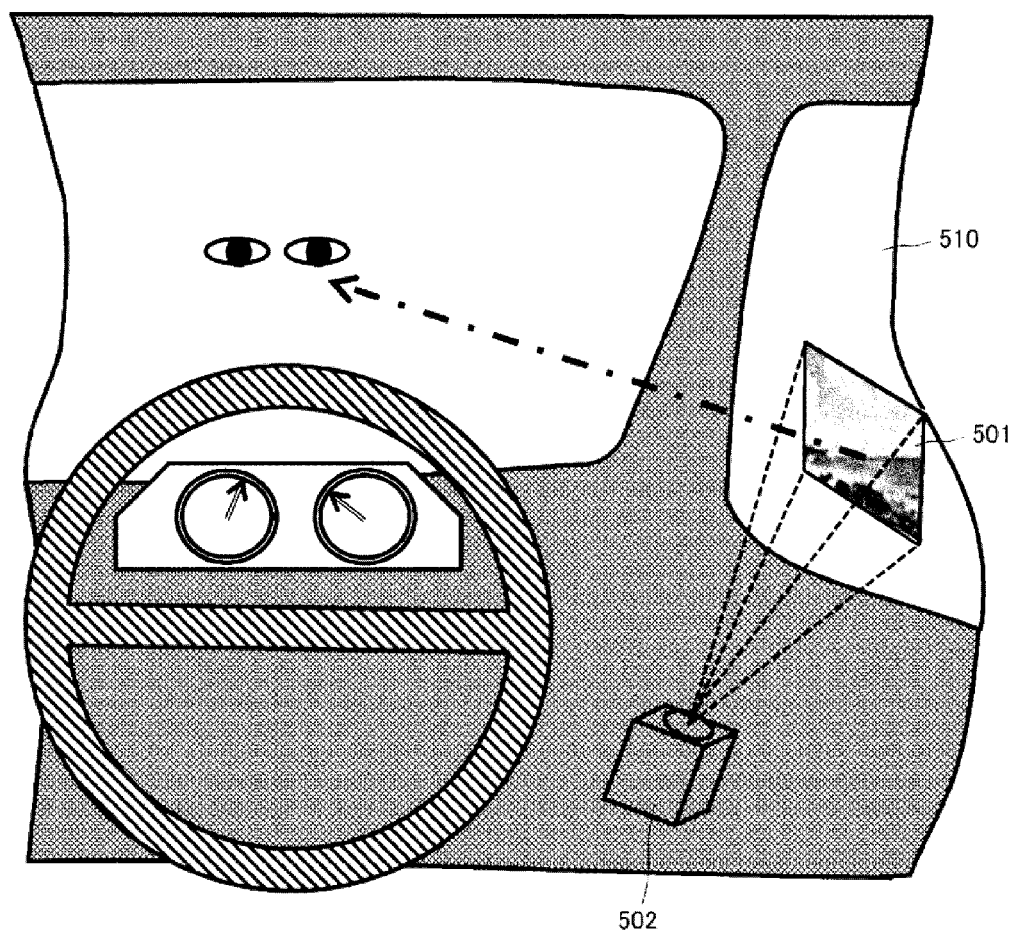

[Fig. 6]
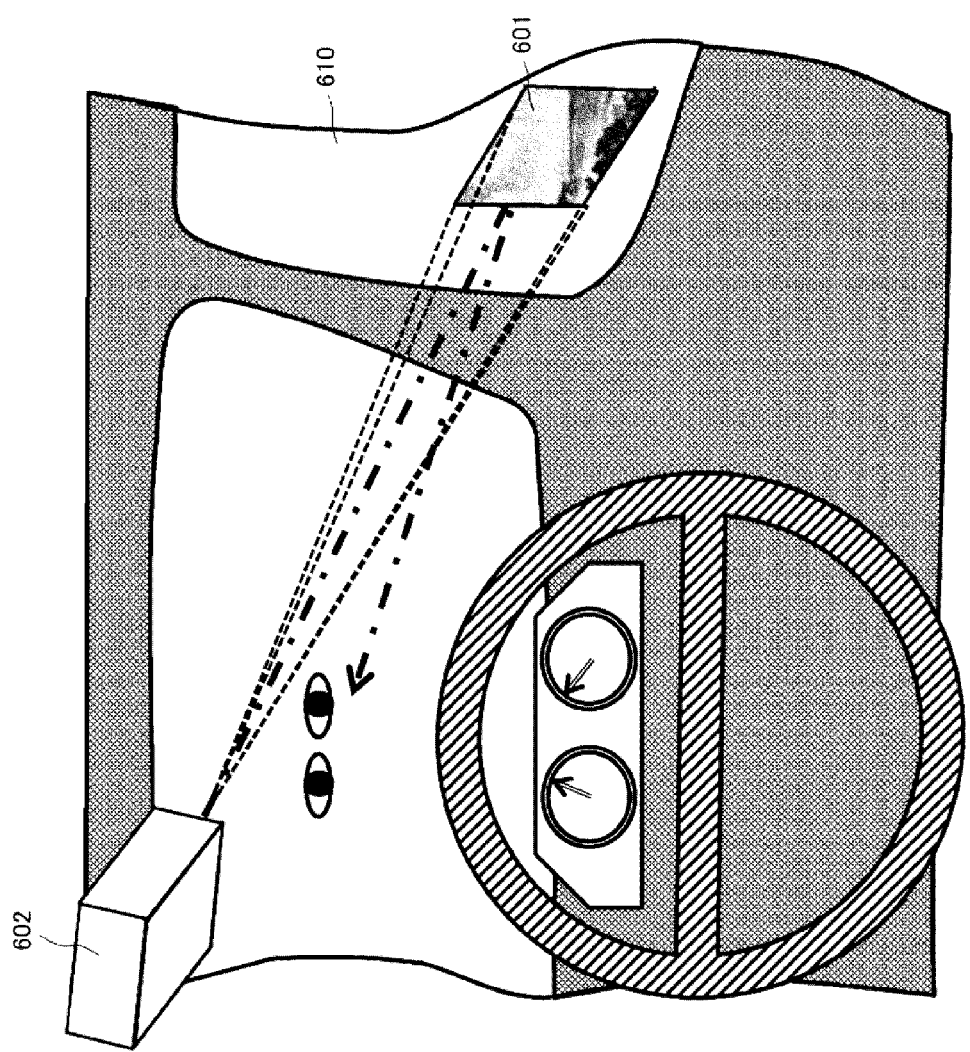

[Fig. 7]
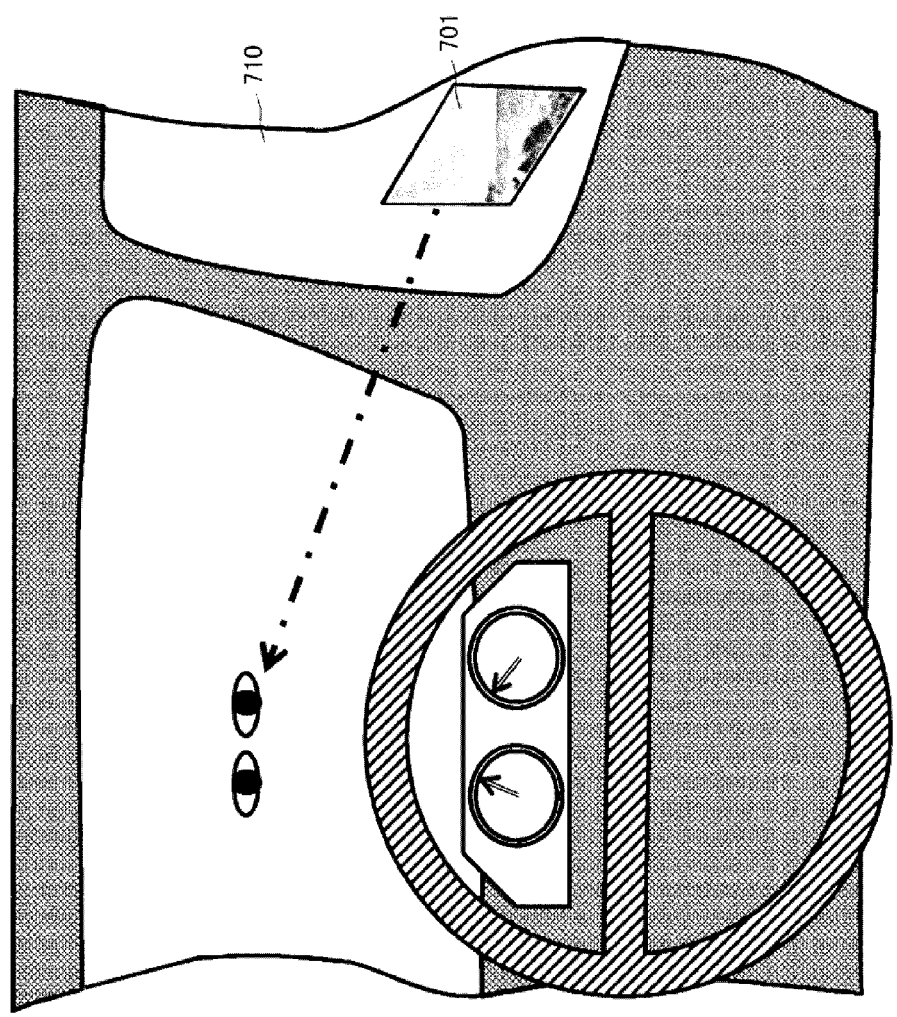

[Fig. 8]
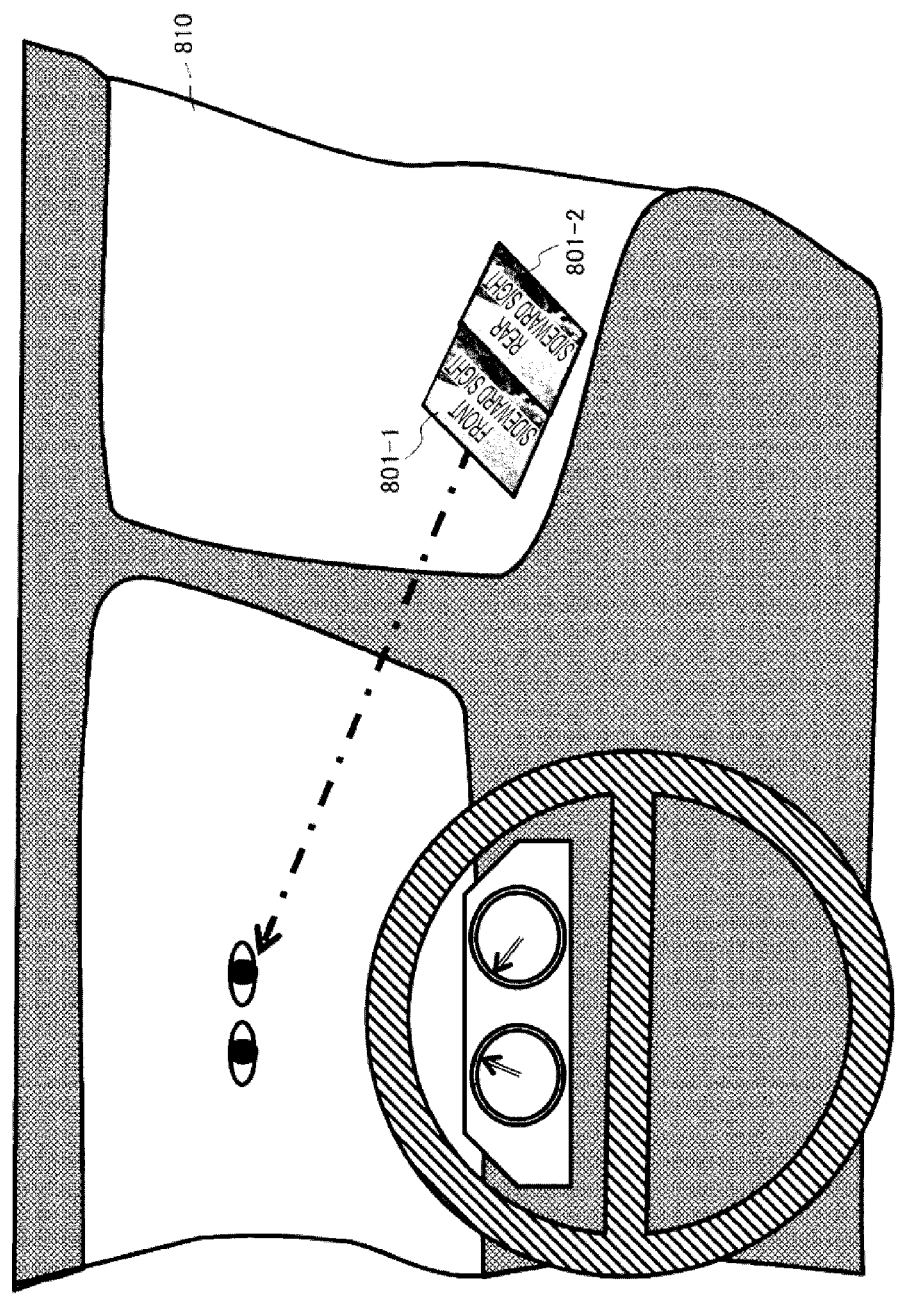

[Fig. 9]
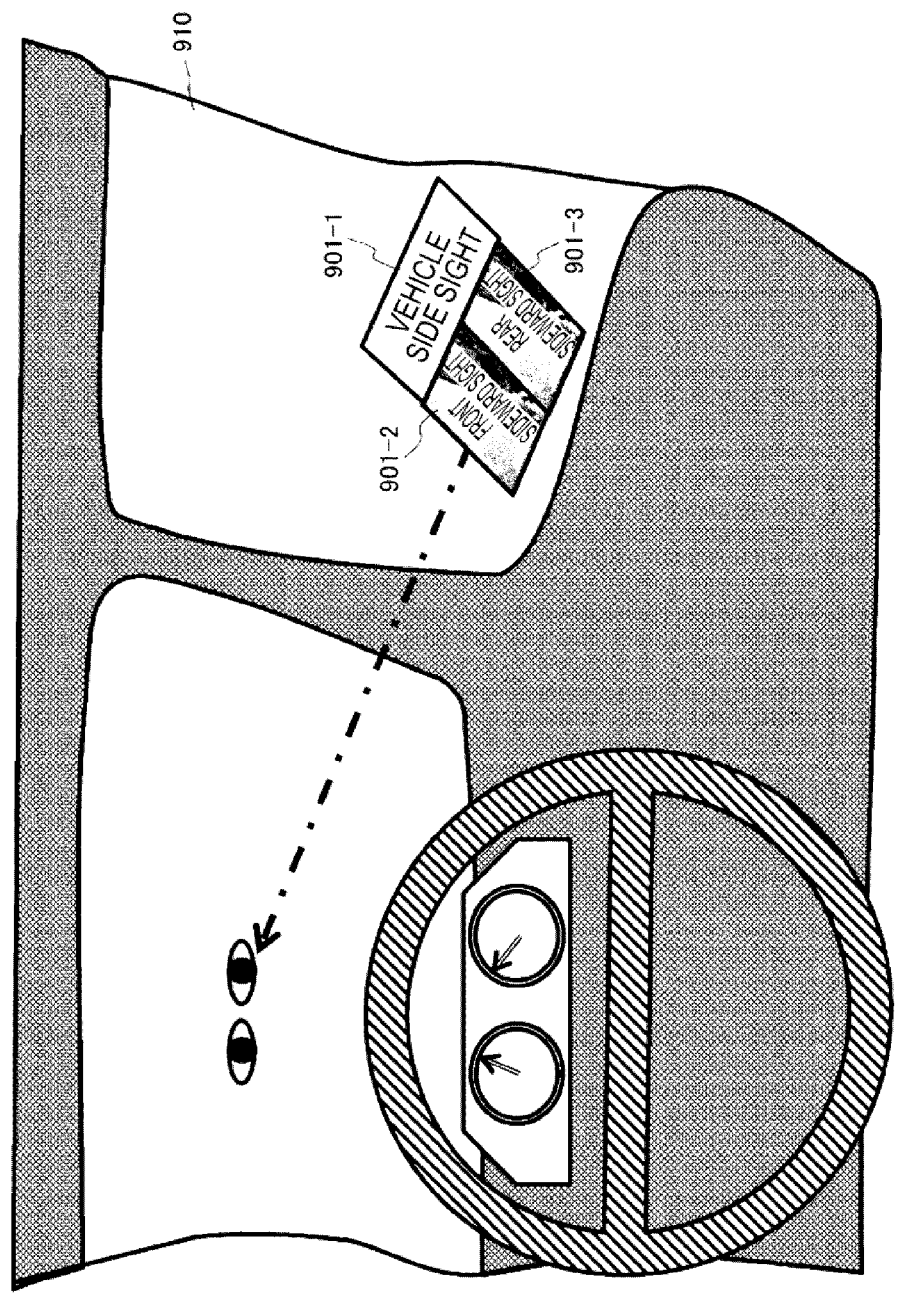

[Fig. 10]
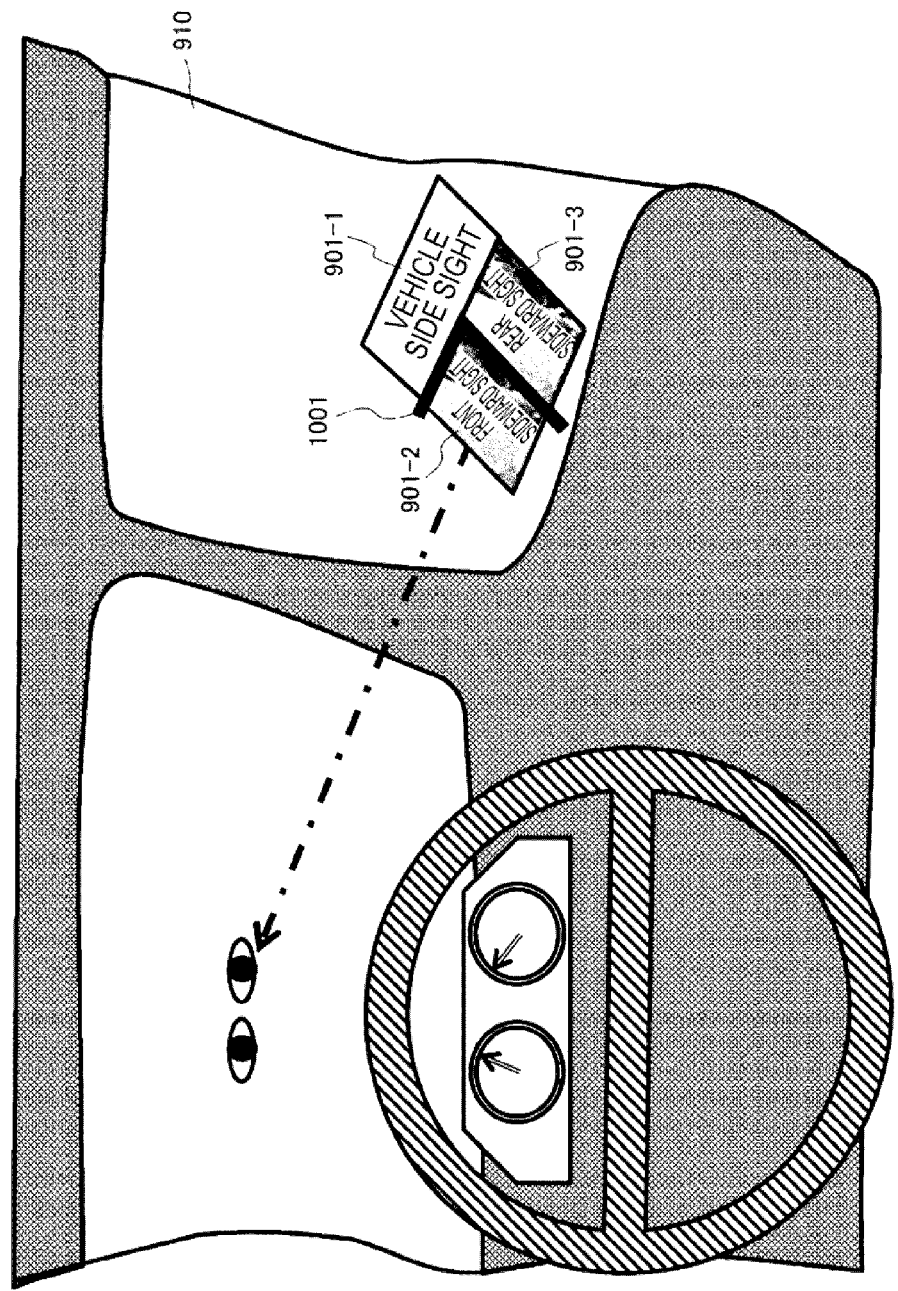

[Fig. 11]
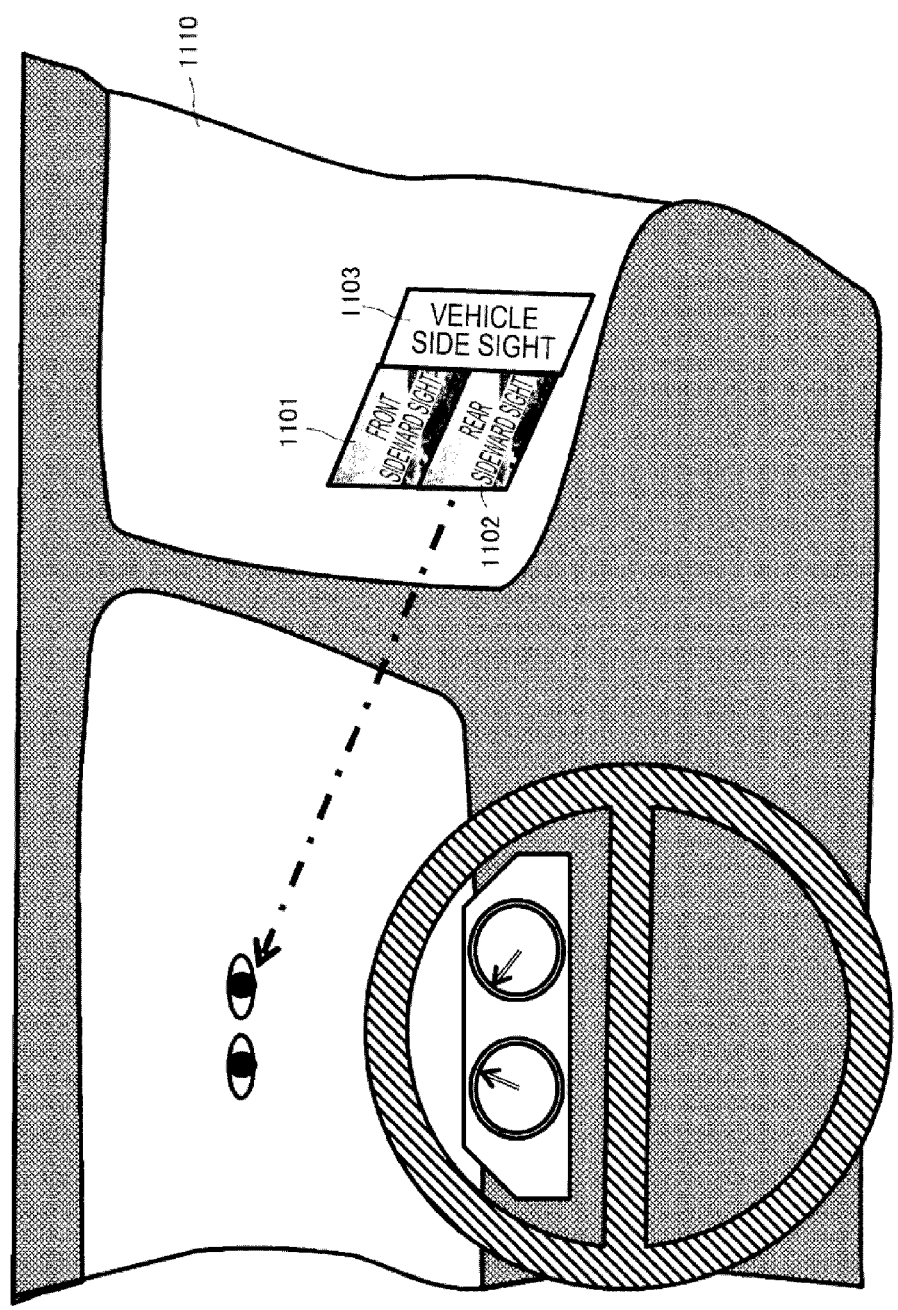

[Fig. 12]
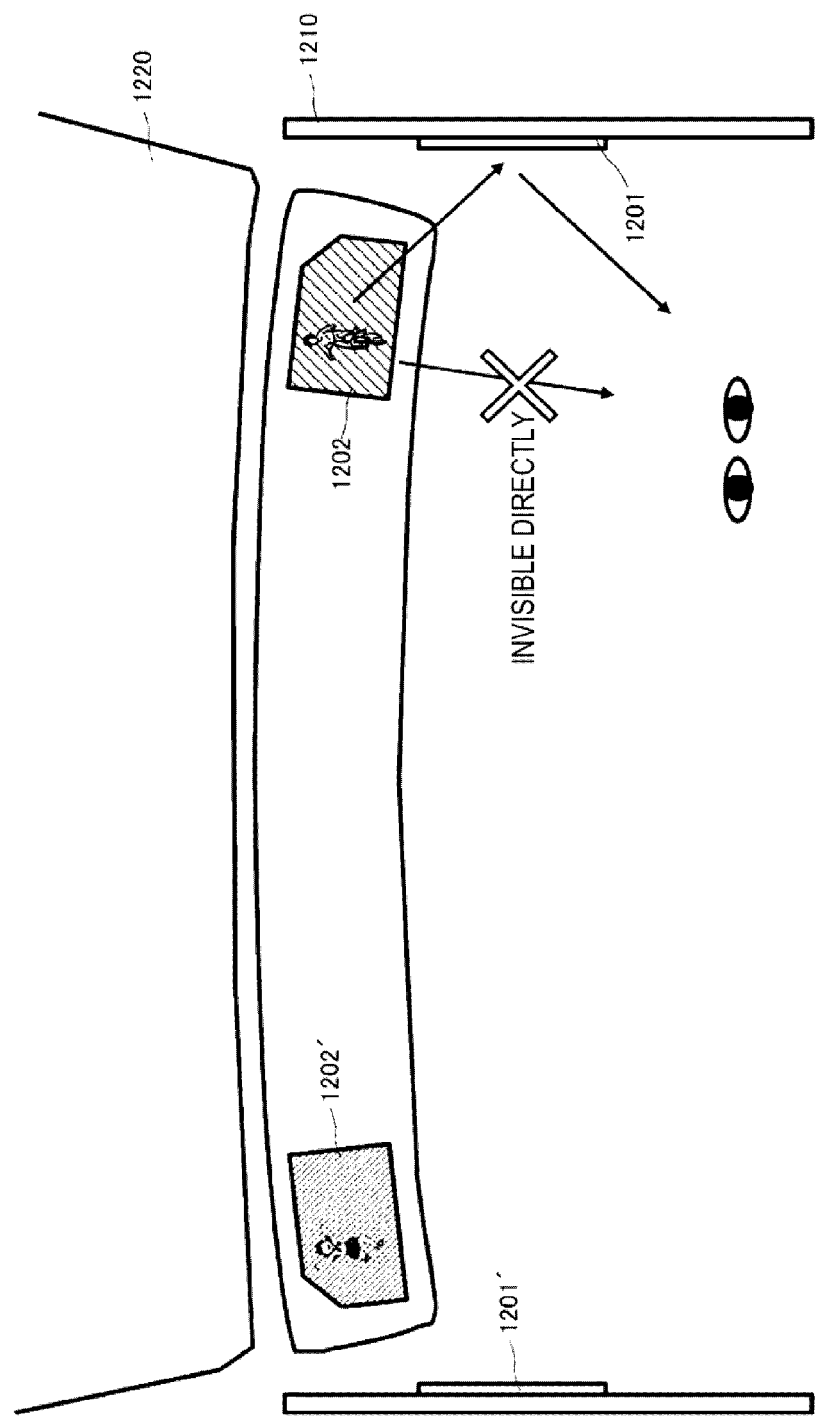

[Fig. 13]
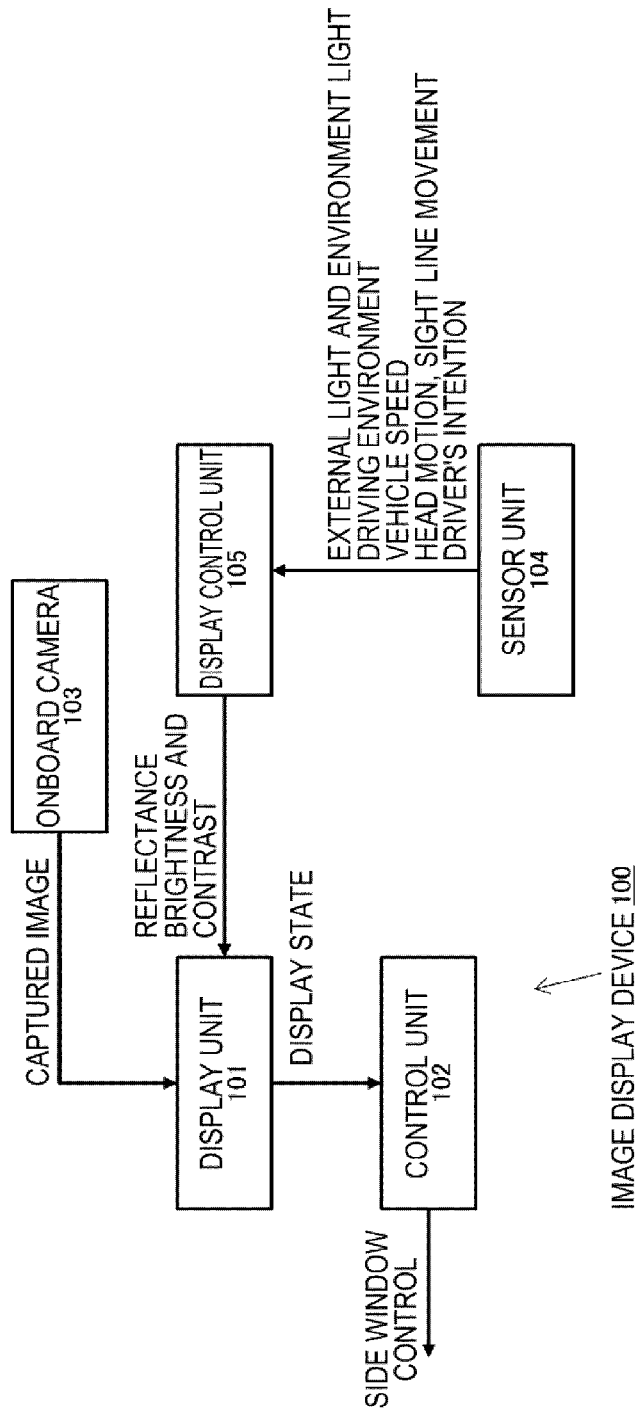

[Fig. 14]
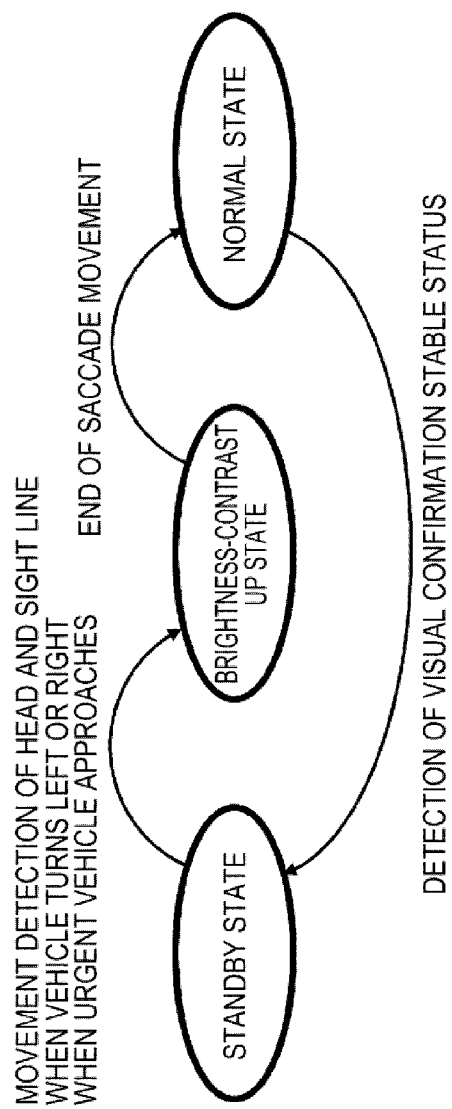

[Fig. 15]
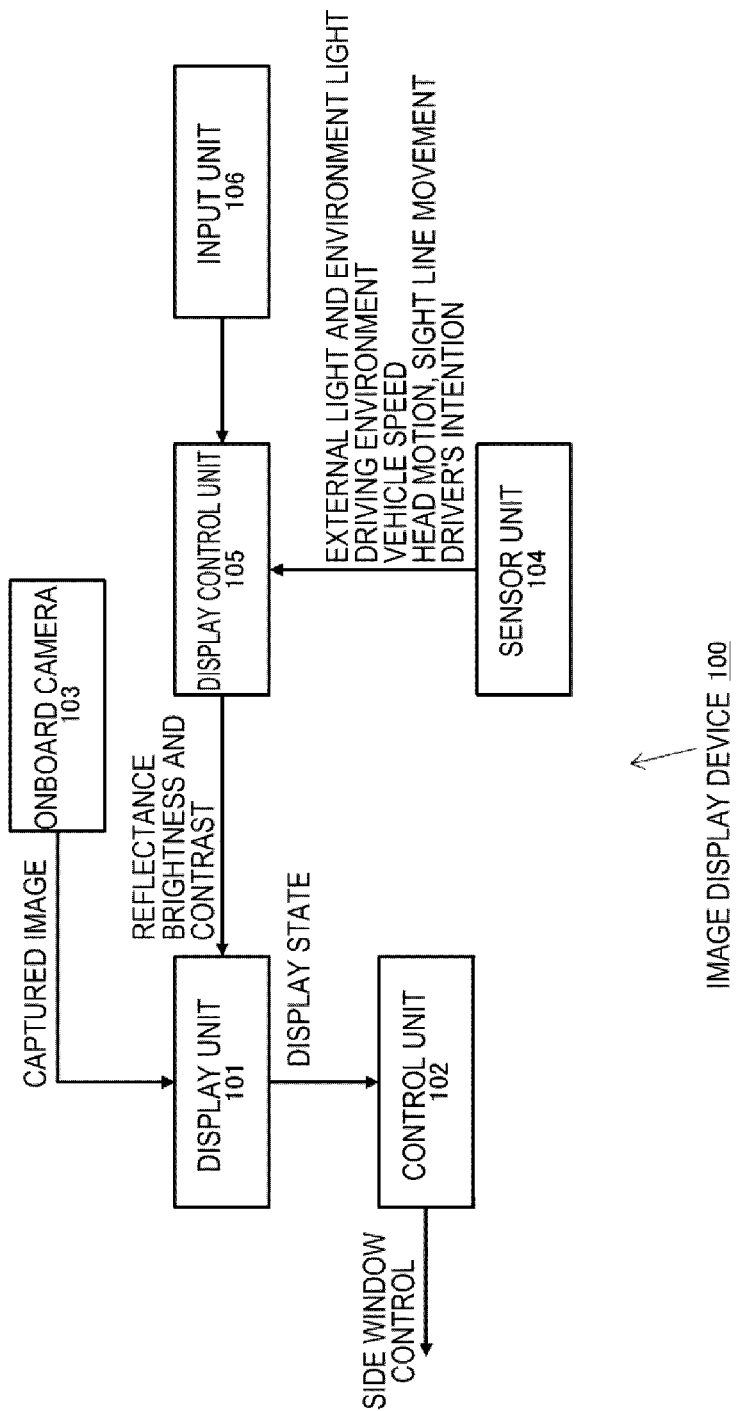

[Fig. 16]
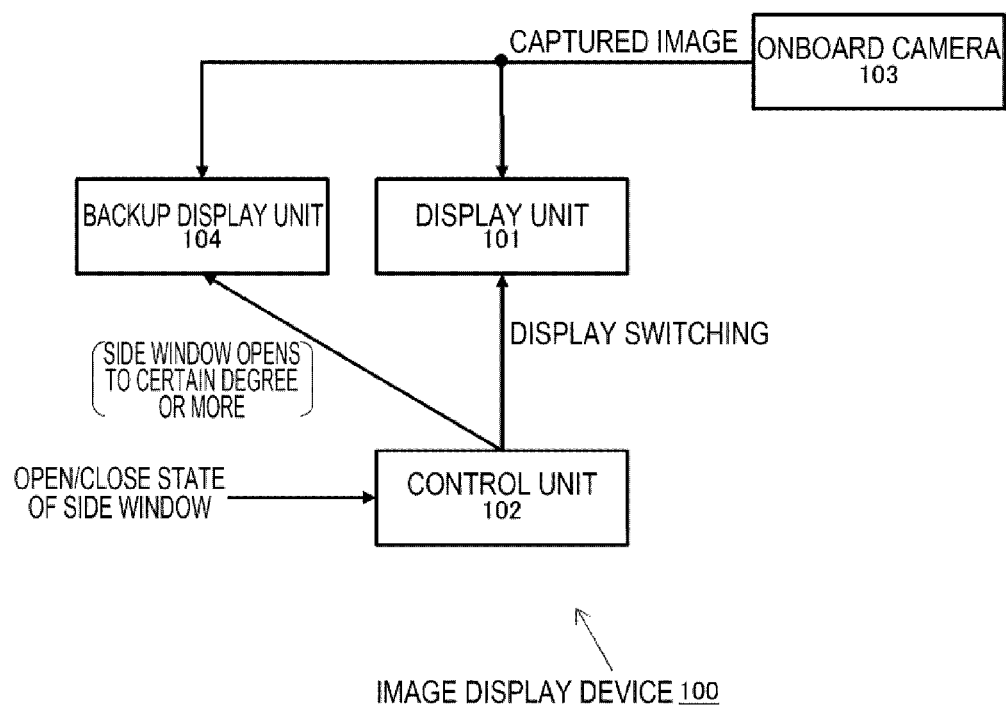

IMAGE DISPLAY DEVICE, IMAGE DISPLAY METHOD, AND MOVING OBJECT

CROSS REFERENCE TO RELATED APPLICATIONS

This is a U.S. National Stage Application under 35 U.S.C. § 371, based on International Application No. PCT/JP2017/008249, filed Mar. 2, 2017, entitled "IMAGE DISPLAY DEVICE AND METHOD FOR A VEHICLE", which claims priority under 35 U.S.C. § 119(a)-(d) or 35 U.S.C. § 365(b) to Japanese Priority Patent Application JP 2016-082621 filed Apr. 18, 2016, the entire contents of each of which are incorporated herein by reference.

TECHNICAL FIELD

The technology disclosed in the present specification relates to an image display device, an image display method, and a moving object for displaying a captured image of a camera, and for example relates to an image display device, an image display method, and a moving object for displaying an image behind or diagonally behind a vehicle or the like that is captured by an onboard camera in a vehicle interior.

BACKGROUND ART

In recent years, instead of door mirrors and a rear view mirror of a car, a camera monitoring system (CMS) that displays an rearward or diagonally rearward image captured by an onboard camera on a flat panel display (FPD) device such as a liquid crystal display (LCD) in order to visually confirm an approaching object and an obstacle behind or diagonally behind a vehicle is being put into production.

A mirror is removed and replaced by the CMS, making door mirrors of the past unnecessary, and thereby not only car design becomes sophisticated, but traveling of the vehicle becomes smooth due to reduction of air resistance, and in addition there is contribution to improvement of fuel efficiency. Also, in a vehicle type that is unable to confirm its rearward by a rear view mirror because of a rearward loading platform, like a large-sized vehicle, can perform the same rearward confirmation as a rear view mirror of a standard-sized car.

In the past (or when not utilizing the CMS), a sight is ensured for a driver to view left and right in a frontward through door mirrors, when the driver confirms a rearward via the door mirrors. For example, a dangerous situation can be sensed to a certain extent through a gap of a door mirror and a front pillar (A pillar), by moving left and right eyes and a head. In contrast, when rearward confirmation is performed by the CMS configured with a camera and a monitor instead of the mirrors, a screen image of the monitor located in the vehicle interior is made apart from a direction of a sight that the driver is to confirm by viewing (in particular, left and right sights in the frontward that are viewed through the door mirrors), and thereby a motion sequence of uniaxial rotation in which the driver momentarily views frontward in a cycle of turning motion of a neck is lost. In particular, when the monitor gets away from the left and right in the frontward, turning of a sight line becomes less frequent, and thus it is anticipated that frontward overlooking becomes more frequent, which would be within the sight around the mirrors in the past. That is, vehicle rearward and frontward left and right information becomes discrete, and thereby the driver's sight line movement amount for recognizing the vehicle surrounding area is increased so as to influence quick situation determination.

For example, there is proposed an electronic side mirror device that projects a video captured by an image capturing unit that captures an image of a side direction from a vehicle, on a holographic optical element arranged in a front window or a side window of a vehicle (for example, refer to Patent Literature 1). However, according to this electronic side mirror device, still image information can be displayed by forming an image on a holographic film of a window glass, but with a holographic panel for the purpose of obtaining light diffraction characteristics, it is difficult to achieve full-color moving image display performance which is necessary in urgent vehicle recognition of the CMS. Also, even if a full-color moving image is displayed on the holographic panel, a smooth rearward view field is difficult to reproduce due to a speckle problem of reference light, and safety driving is thought to unachievable due to much convergence.

Note that a location of a mirror for confirming a rearward approaching object from the vehicle left or right is limited to door side, fender left and right, and the like, because of characteristics of specular reflection. In particular, in a trend of recent years, the location of the mirror is over left and right side windows mainly, and in view of ensuring the frontward left and right view fields at the time of turning right or left, a structure is designed to ensure a slight interspace in the gap between the door mirror and the front pillar, in order to ensure a sight for allowing the driver to view the left and right in the frontward through the door mirror.

Also, in view of preventing an accident hitting the approaching object from the rearward at the time of motion of turning right or left, the driver is to indirectly confirm the approaching object from the rearward by the mirror, and turn to confirm the blind angle of diagonally rearward, and simultaneously confirm an obstacle in the forward travel turn direction, and the above structure design has an advantage that the sight line is concentrated in the area of straight sight line movement that passes through a mirror vicinity.

In contrast, in the CMS, when the monitor is located at a position significantly separated from the door mirror of the past, the sight line movement amount becomes larger between when confirming the approaching object from the rearward and when confirming the obstacle in the forward travel turn direction, for example at the vehicle interior near a door hinge, so as to increase a risk of generating temporal delay in sensing a dangerous situation.

CITATION LIST

Patent Literature

PTL 1: JP 2011-213186
PTL 2: WO 2013/191085

SUMMARY

Technical Problem

A purpose of the technology disclosed in the present specification is to provide an image display device, an image display method, and a moving object capable of preferably displaying an image behind or diagonally behind a vehicle or the like that is captured by an onboard camera, in a vehicle interior.

Solution to Problem

According to a first aspect of the technology disclosed in the present specification, there is provided an image display device including: a display unit configured to display an image on a side window of a vehicle; and a control unit configured to control an opening and closing motion of the side window, according to a display state of the display unit.

According to a second aspect of the technology disclosed in the present specification, the control unit of the image display device according to the first aspect prohibits an opening operation of the side window, or closes the open side window while the display unit is displaying the image.

According to a third aspect of the technology disclosed in the present specification, the display unit of the image display device according to the first aspect displays the image in a partial region away from a pillar of the vehicle.

According to a fourth aspect of the technology disclosed in the present specification, the display unit of the image display device according to the first aspect includes a semi-transmissive reflection plate arranged in a partial region of the side window, and a projection unit that projects the image on the reflection plate. The semi-transmissive reflection plate mentioned here may be a reflection film of a constant static reflectance such as a semi-transmissive reflection film, and may be a reflection film that performs an electrochromic reflectance control capable of controlling a reflectance electrically.

According to a fifth aspect of the technology disclosed in the present specification, the projection unit of the image display device according to the fourth aspect is located at a door of the vehicle, and projects an image toward the reflection plate arranged in the side window.

According to a sixth aspect of the technology disclosed in the present specification, the reflection plate of the image display device according to the fifth aspect is configured to anisotropically retroreflect the projected light from the projection unit. The anisotropic retroreflection mentioned here is different from a film of a usual beads type and a light angle cube type that reflects a light to the same direction relative to an incident light, and means a reflection plate of a combiner function for a head up display (HUD) which is of a Fresnel lens or micro prism type that controls a reflection direction relative to an incident light direction.

According to a seventh aspect of the technology disclosed in the present specification, the reflection plate of the image display device according to the fourth aspect is made of one of retroreflection beads or film and a translucent film to which corner cube is transferred and which reflects light to the incident light direction with intense light distribution.

According to an eighth aspect of the technology disclosed in the present specification, the display unit of the image display device according to the first aspect includes a self light emitting element arranged in a partial region of the side window.

According to a ninth aspect of the technology disclosed in the present specification, the display unit of the image display device according to the first aspect includes a monitor capable of anisotropic display and a semi-transmissive reflection plate arranged in a partial region of the side window.

According to a tenth aspect of the technology disclosed in the present specification, the display unit of the image display device according to the first aspect is configured to display the image with a boundary line. It is preferable that the boundary line has a significant line width that allows the driver to obviously and instantaneously determine a boundary corresponding to a bezel between the background and the monitor that enter in a view field in the same direction, when the driver looks into the display image of the display unit. For example, it is preferable that the image is rimmed with a boundary line of at least $1/V=1.7$ minutes, i.e., view angle of $0.028°$ or more, which is converted from the lowest eyesight $V=0.6$ of a usual driver who can acquire a license.

According to an 11th aspect of the technology disclosed in the present specification, the display unit of the image display device according to the first aspect is configured to divide the display region into a plurality of regions and display a plurality of images simultaneously. It is preferable that the images are separated by boundary lines that have a significant line width in the same way as the above, when the plurality of images are displayed simultaneously.

According to a 12th aspect of the technology disclosed in the present specification, the display unit of the image display device according to the 11th aspect displays an image of a front sideward sight of the vehicle and an image of a rear sideward sight side-by-side.

According to a 13th aspect of the technology disclosed in the present specification, the display unit of the image display device according to the 12th aspect further displays an image of a side sight of the vehicle.

According to a 14th aspect of the technology disclosed in the present specification, the image display device according to the first aspect further includes: sensor unit; and display control unit configured to control at least one of brightness and contrast of the image displayed by the display unit and a reflectance of a semi-transmissive reflection plate, on the basis of a detection result of the sensor unit. For example, the sensor unit detects external light from around the vehicle. Then, the display control unit optimally controls the brightness or the contrast of the image in such a manner that the brightness with which the driver views the outside in the direct sight through the side window is not different from the brightness of the image that the display unit displays on the side window.

According to a 15th aspect of the technology disclosed in the present specification, the display control unit of the image display device according to the 14th aspect controls at least one of the brightness and the contrast of the image and the reflectance of the semi-transmissive reflection plate, in response to the sensor unit detecting a head motion or a sight line movement of a driver of the vehicle.

According to the 16th aspect of the technology disclosed in the present specification, the display control unit of the image display device according to the 14th aspect is configured to regard the sensor unit detecting the head motion or the sight line movement of the driver of the vehicle as a precursory sign of the driver viewing the display image of the display unit and make the brightness or the contrast of the image higher than a usual set value.

According to the 17th aspect of the technology disclosed in the present specification, the display control unit of the image display device according to the 14th aspect is configured to find no precursory sign of the driver viewing the display image of the display unit when the sensor unit does not detect the head motion or the sight line movement of the driver of the vehicle for a certain period, and make the brightness or the contrast of the image lower than the usual set value.

According to a 18th aspect of the technology disclosed in the present specification, there is provided an image display device including: display unit that is provided in a side window of a vehicle, and that is configured to display an image in a partial region away from a pillar of the vehicle.

According to a 19th aspect of the technology disclosed in the present specification, there is provided an image display method including: displaying an image on a side window of a vehicle; and controlling an opening and closing motion of the side window, according to a display state in the displaying step.

According to a 20th aspect of the technology disclosed in the present specification, there is provided an image display method including: displaying an image in a partial region away from a pillar of a vehicle, in a side window of the vehicle.

According to a 21th aspect of the technology disclosed in the present specification, there is provided a moving object including: a side window configured to make an opening and closing motion; a display unit configured to display an image on the side window; and a control unit configured to control the opening and closing motion of the side window, according to a display state of the display unit.

According to a 22nd aspect of the technology disclosed in the present specification, there is provided an apparatus comprising circuitry configured to control an opening and closing motion of a window of a vehicle based on a display state of a display that is configured to display on the window an image captured by a camera mounted on the vehicle.

According to a 23rd aspect of the technology disclosed in the present specification, the camera according to the $22^{nd}$ aspect is a side-view camera mounted on a side of the vehicle; and the display according to the $22^{nd}$ aspect is configured to display on a side window of the vehicle the image captured by the camera.

According to a 24th aspect of the technology disclosed in the present specification, the display according to the $23^{rd}$ aspect is configured to display the image in a partial region away from a pillar of the vehicle.

According to a 25th aspect of the technology disclosed in the present specification, the camera according to the $22^{nd}$ aspect is a side-view camera mounted on a side of the vehicle, and the circuitry according to the $22^{nd}$ aspect is further configured to control the opening and closing motion of a side window of the vehicle based on the display state of the display.

According to a 26th aspect of the technology disclosed in the present specification, the image captured by the side-view camera according to the $25^{th}$ aspect is from a rearward perspective with respect to a forward-moving direction of the vehicle.

According to a 27th aspect of the technology disclosed in the present specification, the circuitry according to the $22^{nd}$ aspect is further configured to limit how far the window can be opened while the display is displaying the image.

According to a 28th aspect of the technology disclosed in the present specification, the circuitry according to the $22^{nd}$ aspect is further configured to, if the window is open by more than a threshold amount when the image is to be displayed, close the window so that the window is open by less than the threshold amount.

According to a 29th aspect of the technology disclosed in the present specification, the display according to the $22^{nd}$ aspect comprises a semi-transmissive reflection material disposed within a region of the window, and a projector configured to project the image onto at least a part of the region of the window.

According to a 30th aspect of the technology disclosed in the present specification, the window according to the $29^{th}$ aspect is a side window of the vehicle, and the projector according to the $29^{th}$ aspect is supported by a door of the vehicle in which the window is disposed.

According to a $31^{st}$ aspect of the technology disclosed in the present specification, the reflection material according to the $29^{th}$ aspect is configured and arranged within the region of the window so as to cause projected light from the projector to be reflected anisotropically.

According to a $32^{nd}$ aspect of the technology disclosed in the present specification, the reflection material according to the $29^{th}$ aspect comprises at least one of retroreflection beads, retroreflection film, or a translucent film.

According to a $33^{rd}$ aspect of the technology disclosed in the present specification, the display according to the $22^{nd}$ aspect comprises a light emitting element arranged within the region of the window.

According to a 34th aspect of the technology disclosed in the present specification, the circuitry according to the $22^{nd}$ aspect is further configured to cause the display to display the image with a boundary line.

According to a $35^{th}$ aspect of the technology disclosed in the present specification, the circuitry according to the $22^{nd}$ aspect is further configured to cause the display to divide a display region into a plurality of regions, and simultaneously display a plurality of images captured by a plurality of cameras mounted on the vehicle.

According to a 36th aspect of the technology disclosed in the present specification, the circuitry according to the $22^{nd}$ aspect is further configured to cause the display to display an image of a front sideward view from the vehicle and an image of a rear sideward view from the vehicle side-by-side.

According to a $37^{th}$ aspect of the technology disclosed in the present specification, the circuitry according to the $36^{th}$ aspect is further configured to cause the display to display an image of a side view from the vehicle.

According to a 38th aspect of the technology disclosed in the present specification, a system including the apparatus according to the $22^{nd}$ aspect further comprises a sensor, and the circuitry according to the $22^{nd}$ aspect is further configured to control at least one of (i) brightness of the image displayed by the display, (ii) contrast of the image displayed by the display, (iii) a reflectance of a semi-transmissive reflection material disposed within a region of the window, or (iv) a display configuration of a plurality of images captured by a plurality of cameras mounted on the vehicle, on the basis of a detection result of the sensor.

According to a 39th aspect of the technology disclosed in the present specification, the sensor according to the $38^{th}$ aspect comprises at least one of (a) a motion sensor configured to detect a head motion or an eye motion of a driver of the vehicle, (b) a vehicle speed sensor configured to detect a traveling speed of the vehicle, or (c) an illuminance sensor configured to detect an illuminance of an environment around the vehicle.

According to a 40th aspect of the technology disclosed in the present specification, the circuitry according to the $38^{th}$ aspect is further configured to set the brightness or the contrast of the image higher than a usual set value, in response to the sensor detecting a head motion or a sight line movement of a driver of the vehicle.

According to a $41^{st}$ aspect of the technology disclosed in the present specification, the circuitry according to the $40^{th}$ aspect is further configured such that, when the sensor does not detect a head motion or a sight line movement of a driver of the vehicle for a certain period, the circuitry sets the brightness or the contrast of the image lower than a usual set value.

According to a $42^{nd}$ aspect of the technology disclosed in the present specification, the circuitry according to the $22^{nd}$ aspect is further configured to display the image on the window for a predetermined time after the vehicle is put in a powered off state.

According to a 43$^{rd}$ aspect of the technology disclosed in the present specification, an image display method comprises acts of displaying an image on a window of a vehicle, and controlling an opening and closing motion of the window, according to whether the image is being displayed.

According to a 44th aspect of the technology disclosed in the present specification, a computer-readable medium is encoded with instructions that, when executed by a controller, cause the controller to perform a method comprising controlling an opening and closing motion of a window of a vehicle based on a display state of a display that is configured to display on the window an image captured by a camera mounted on the vehicle.

Advantageous Effects of Invention

According to the technology disclosed in the present specification, there can be provided an image display device, an image display method, and a moving object capable of preferably displaying an image behind of diagonally behind a vehicle or the like that is captured by an onboard camera in a vehicle interior.

Note that the advantageous effects described in this specification are merely for the sake of example, and the advantageous effects of the present disclosure are not limited thereto. Furthermore, in some cases the present disclosure may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

BRIEF DESCRIPTION OF DRAWINGS

FIG. 1 is a diagram schematically illustrating an exemplary configuration of an image display device 100 that employs the technology disclosed in the present specification.

FIG. 2 is a diagram illustrating an example that applies an image display device 100 to a vehicle.

FIG. 3 is a diagram illustrating an installation example of onboard cameras 103 and image capturing areas 301.

FIG. 4 is a diagram for describing an exemplary variant of a display unit 101.

FIG. 5 is a diagram for describing an exemplary variant of a display unit 101.

FIG. 6 is a diagram for describing an exemplary variant of a display unit 101.

FIG. 7 is a diagram for describing an exemplary variant of a display unit 101.

FIG. 8 is a diagram for describing an exemplary variant of a display unit 101.

FIG. 9 is a diagram for describing an exemplary variant of a display unit 101.

FIG. 10 is a diagram for describing an exemplary variant of a display unit 101.

FIG. 11 is a diagram for describing an exemplary variant of a display unit 101.

FIG. 12 is a diagram for describing an exemplary variant of a display unit 101.

FIG. 13 is a diagram illustrating an exemplary variant of an image display device 100 illustrated in FIG. 1.

FIG. 14 is a diagram illustrating a state transition diagram in a display control unit 105.

FIG. 15 is a diagram illustrating an exemplary variant of an image display device 100 illustrated in FIG. 1.

FIG. 16 is a diagram illustrating an exemplary variant of an image display device 100 illustrated in FIG. 1.

DESCRIPTION OF EMBODIMENTS

In the following, an embodiment of the technology disclosed in the present specification will be described in detail with reference to drawings.

FIG. 1 schematically illustrates an exemplary configuration of an image display device 100 that employs the technology disclosed in the present specification. The image display device 100 is provided in a vehicle (not illustrated) mainly, and is used to display an image of a CMS on a side window in a vehicle interior.

The image display device 100 includes a display unit 101 that displays an image on the side window, and a control unit 102 including circuitry that controls opening and closing motion of the side window, depending on a display state of the display unit 101. In some embodiments, the control unit 102 may determine when the vehicle is in a powered on state or a powered off state. In such embodiments, the control unit 102 may cause the display unit 101 to display an image of a CMS on the side window at times that the vehicle is in a powered on state, and cause the display unit 101 to cease displaying the image on the window when the vehicle transitions to a powered off state. In some embodiments, the control unit 102 may cause the display unit 101 to display the image on the window for a predetermined time after the vehicle is put in a powered off state.

FIG. 2 illustrates an example that applies the image display device 100 to the vehicle. The display unit 101 is configured with a semi-transmissive reflection plate 201 located at a side window 210, and a projection unit 202 that projects an image on this semi-transmissive reflection plate 201, for example. The semi-transmissive reflection plate mentioned here may be a reflection film of a constant static reflectance such as a semi-transmissive reflection film, and may be a reflection film that performs an electrochromic reflectance control capable of controlling a reflectance electrically. The reflection plate 201 is preferably arranged at a vicinity of a front pillar (or a site a little away from the front pillar). On the other hand, the projection unit 202 is installed near a dashboard (an instrument panel cluster) in the illustrated example, and projects an image of the CMS or the like toward the semi-transmissive reflection plate 201. The projection unit 202 is configured with a micro projector or the like, for example.

In the example illustrated in FIG. 2, the semi-transmissive reflection plate 201 is arranged in a partial region of the side window 210, but the reflection plate may be arranged over the entire side window 201. Note that, by employing a configuration that arranges the semi-transmissive reflection plate 201 only in the partial region of the side window 210, the driver can obtain a frontward direct sight when trying to confirm a vehicle front side direction from the side window 210, without interference by the CMS image. That is, the driver can obtain a frontward direct sight through the side window 210 and a rearward indirect sight by the CMS image, within the same sight line. Preferably, the semi-transmissive reflection plate 201 is arranged in a view field direction in which the driver views a door mirror of the past.

The translucent reflection plate 201 is manufactured by performing aluminum vapor deposition on a glass surface, for example. The semi-transmissive reflection plate 201 is configured with an anisotropic reflection sheet made of one of micro prism, Fresnel lens configuration, and holographic reflection, or external light short wavelength reference light excitation material, and an image is displayed by projected light from the projection unit 202. Also, the semi-transmissive reflection plate 201 may be configured with a reflectance variable mirror (electrochromic mirror) capable controlling the reflectance or the transmittance electrically, for example. For example, a light-controlling half mirror (for example, refer to Patent Literature 2) can be utilized as the reflection plate 201. A directional CMS image can be displayed to the driver via the reflectance variable mirror.

Alternatively, the reflection plate 201 may have a vertical grid reflection mirror surface region. Alternatively, the reflection plate 201 may have the vertical grid reflection mirror surface region, and may be formed such that the proportion of this grid interval and the mirror surface becomes smaller as the side window 210 gets closer to its periphery.

Note that FIG. 2 illustrates an example in which the reflection plate 201 is installed in the side window 210 of a driver's seat side (or a right side), but a display unit of the same configuration is also assumed to be installed in a side window of a front passenger seat side (or a left side).

The image displayed by the display unit 101, in other words, the image that the projection unit 202 projects on the semi-transmissive reflection plate 201 is a CMS image for rearward confirmation that the onboard cameras 103 capture the rearward of the vehicle, specifically. In the following, unless otherwise mentioned, color moving images captured by the onboard cameras 103 are displayed as the CMS images. FIG. 3 illustrates an installation example of the onboard cameras 103 and their image capturing areas 301. The onboard camera 103 is installed at the side of the driver's seat side (or the front passenger seat side) of the vehicle, and captures an image of a region diagonally behind the vehicle that has been covered by the door mirror of the past, and displays the captured image as the CMS image for the rearward confirmation by the display unit 101. Note that, from a view point that the door mirror is replaced with the CMS image, the door mirror is not depicted in the vehicle illustrated in FIG. 3.

The onboard camera 103 may be an all-sky camera or a wide angle camera, for example. Then, a view angle corresponding to the area that can be observed by the door mirror may be cut out from an all-sky image or a wide angle image captured by the all-sky camera or the wide angle camera, and be displayed by the display unit 101. Alternatively, a view angle designated by a user such as the driver may be cut out from the all-sky camera and the wide angle camera, and be displayed by the display unit 101.

Also, during a period in which the display unit 101 displays the CMS image for rearward confirmation (or when the driver observes the CMS image for rearward confirmation), the control unit 102 sets the side window in a complete closing state and prohibits opening motion, in order to maintain a state in which the projection unit 202 can project the image on the semi-transmissive reflection plate 201, in other words, a state in which the driver can confirm the rearward.

For example, in the case of the vehicle provided with a power window system, the control unit 102 prohibits (locks) opening operation at the time of a closing state of the side window, and drives the side window to close the side window at the time of an opening state of the side window. Also, in the case of a hand-operated side window, the control unit 102 may restrict the opening operation of the side window by using a mechanism such as a solenoid actuator, for example. As another exemplary configuration, the display may be switched to a backup display unit that displays the CMS image instead of the side window, when the side window opens at a certain degree or more, in order to enable the rearward confirmation even in an entire opening mode of the side window while displaying the CMS image on the side window, at the time of usual use (refer to FIG. 16).

From FIG. 2, it can be understood that, while the driver is observing the CMS screen image or is moving the sight line to observe the CMS screen image, visual perception in the front side direction at the vicinity of the front pillar enters a part of the view field, and therefore complete blind angle occurrence can be prevented to the minimum. Thus, at the time of turning right or left of the vehicle, the driver can simultaneously obtain a frontward sight in the same view field, through the CMS image (or by using a gap between the front pillar and the CMS image), when visually confirming the vehicle rearward or diagonally rearward of the vehicle with the CMS image for rearward confirmation displayed at a part of the side window.

The driver can confirm the rearward with a substantially same sight line movement as viewing the door mirror of the past, and in a cycle of the motion sequence of the rearward confirmation, can momentarily view the front view field as well, from the gap between the CMS image displayed on the translucent reflection plate 201 of the side window and the front pillar, and perceive the front video of the direct sight in the peripheral view field of the driver during viewing the monitor image of the CMS at the center view field of the sight line. Thus, the driver can reduce overlooking and recognition delay to the minimum in the rearward confirmation sequence, and prevent an accident hitting the approaching object from the rearward or the like. Also, when the image display device 100 according to the present embodiment is applied to the vehicle, the driver can visually confirm the CMS image for rearward confirmation with a little sight line movement amount, and confirm the frontward view field immediately. That is, the track of the sight line has a transition that is extremely close to the door mirror of the past, and the work load of confirmation by the driver is reduced, and thereby a danger is expected to be recognized quickly.

Note that Patent Literature 1 discloses an electronic side mirror device configured to project a video captured by an onboard camera on a holographic optical element arranged in a side window. However, although the holographic optical element reproduces and displays a still image of a specific single wavelength by coherent light, or functions as a diffraction plate of the projected image by a specific wavelength light source at the time of moving image, but there is a problem that the holographic optical element is unable to display a full-color moving image for the CMS. The CMS is a device necessary for instantaneous situation recognition around the vehicle relevant to driving by the driver particularly, and has an important role such as recognition of an urgent vehicle for example, and thus does not play the role sufficiently with a monochromatic display.

Here, an exemplary variant of the display unit 101 will be described.

For example, a reflection plate that includes a vertical grid reflection mirror surface region may be used as the reflection plate 201. In this case, the driver can view the CMS image by moving the sight line when the driver wants to confirm the rearward, while viewing the direct sight during usual frontward visual confirmation steering.

Also, the reflection plate 201 may include the vertical grid reflection mirror surface region, and may be formed in such a manner that the proportion of this grid interval and the mirror surface becomes smaller as the side window 210 gets closer to its periphery. In this case as well, the driver can view the CMS image by moving the body intuitively when confirming the rearward, while viewing the direct sight during the usual frontward visual confirmation steering. That is, the driver can confirm the rearward, while obtaining the direct sight, by moving the body intuitively and naturally, depending on driving situation.

Also, an image having left-right parallax may be displayed from the projection unit 202 to the reflection plate 201. In this case, the driver observes the three-dimensional CMS image having the left-right parallax to confirm the rearward.

Also, the region of the reflection plate 201 located at the side window 210 does not set a noticeable frame basically. Note that, in order to make it obvious that the CMS image is a sight line movement target for the driver, the CMS image is not displayed seamlessly, but a frame is formed as illustrated with the reference number 211 of FIG. 2. The frame 211 is preferably to an extent that does not become a large interference in the direct sight through the side window 210 by the driver. The frame 211 may be provided in side edges of the reflection plate 201, and the frame 211 may be displayed in the CMS image projected by the projection unit 202. It is preferable that the frame 211 is a boundary line that has a significant line width that the driver can visually confirm. The boundary line having the significant line width is a boundary line that allows the driver to obviously and instantaneously determine the background that enters the view field in same the direction and the boundary corresponding to a bezel of the monitor, when the driver looks into the CMS image projected on the reflection plate 201. For example, a boundary line of at least 1/V=1.7 minutes, i.e., view angle of 0.028° or more is desirable, which is converted from the lowest eyesight V=0.6 of a usual driver who can acquire a license. Note that, when the display unit is configured by using a self light emitting element (described later), the frame 211 may be a bezel frame.

For reference, FIG. 4 illustrates a situation in which the CMS image illustrated with a reference number 401 is seamlessly displayed on the side window 210 (the dotted line is not displayed actually). The seamlessly displayed CMS image 401 is concealed in the direct sight that can be viewed through the side window 210, and it is concerned that the driver is unable to instantaneously identify which part is the display of the CMS image 401, causing a significant failure in confirmation of the direct sight and the indirect sight. If the boundary of the image peripheral portion of this CMS is reduced to an degree unrecognizable visually, it becomes difficult to determine whether the sight is the frontward direct sight or the rearward indirect sight, depending on driving situation, causing confusion in recognition during that and increasing the risk of delay in handling operation and erroneous recognition and incorrect operation, and thereby the display illustrated in FIG. 4 is to be avoided.

Also, FIG. 2 has illustrated the exemplary configuration that installs the projection unit 202 near the dashboard (instrument panel cluster), but the installation site of the projection unit 202 is not limited thereto. When the projection unit 202 is configured with a small device like a micro projector, the installation site is flexible. For example, a projection unit 502 may be embedded in the door, as illustrated in FIG. 5. Although not depicted, the left side (or the door of the front passenger seat side) is configured in the same manner. The projection unit 502 embedded in the door projects light such as the CMS image toward a reflection plate 501 arranged in the side window 510 above. In the exemplary configuration illustrated in FIG. 2, the projected light from the projection unit 202 is directed toward outside, and therefore it is concerned that the light that passes through the reflection plate 201 or the side window 210 enters the sight of the driver of an adjacent vehicle to interfere the sight. In contrast, according to the exemplary configuration illustrated in FIG. 5, the projected light from the projection unit 502 is directed upward, and therefore does not enter the sight of the driver of the adjacent vehicle to interfere the sight.

Also, an anisotropic retroreflection sheet may be used as the reflection plate 501, in the exemplary variant illustrated in FIG. 5. In general, the retroreflection is a reflection phenomenon in which incident light returns to an incidence direction again. The anisotropic retroreflection mentioned here is different from a film of a usual beads type and a light angle cube type that reflects a light to the same direction relative to an incident light, and means a reflection plate of a combiner function for a head up display (HUD) which is of a Fresnel lens or micro prism type that controls a reflection direction relative to an incident light direction. In contrast, the reflection plate 501 made of the anisotropic retroreflection sheet can add the characteristics that projects and displays the CMS image projected from the projection unit 502 below toward the driver, by directional characteristics reflection. Thus, there is an advantage that the CMS image can be viewed only by the driver, and is not dazzling for other passengers and other surrounding traveling vehicles.

Also, FIG. 6 illustrates an exemplary variant in which a projection unit 602 is installed at a head position at the vicinity of eyeball positions of the driver. For example, the projection unit 602 may be fixed to a top panel portion of the vehicle. In this case, the projection unit 602 projects the light such as the CMS image from the direction that is close to the eyeball positions of the driver, such as a vehicle roof for example, on a reflection plate 601 arranged in the side window 610. The CMS image can be viewed only at the vicinity of the sight line position of the driver, by using retroreflection beads or film, or a translucent film to which corner cube is transferred, as the reflection plate 601. Thus, there is an advantage that the CMS image is viewed only be the driver and is not dazzling for other passengers (same as above). For example, the translucent film to which the corner cube is transferred reflects light with intense light distribution to the incident light direction.

FIG. 2, FIG. 5, and FIG. 6, have illustrated the exemplary configuration of the display unit 101 that projects the CMS image from the projection unit on the translucent reflection plate located at the side window. In contrast, as illustrated in FIG. 7, the display unit 101 can also be configured only with a self light emitting element 701 that is arranged in a partial region of a side window 710. The self light emitting element 701 may be of a semi-transmissive type. With the self light emitting element 701 of the semi-transmissive type, the frontward direct sight and the rearward indirect sight can be provided in the same sight line of the driver, in the same way as the above, by controlling the self light emitting brightness and displaying the CMS image.

The self light emitting element of the semi-transmissive type can be a display panel, such as a quantum-dot light emitting diode (QLED) and an organic light emitting diode (OLED), for example. Also, a semi-transmissive QLED or an OLED display panel having a partial active light emitting unit may be used.

The self light emitting element of this type is of a semi-transmissive type, and can adjust the brightness. Thus, the brightness and contrast of the self light emitting element of the monitor panel can be adjusted according to the object illumination intensity in the region of the direct sight and according to the environment light for example, and thereby a balance is made in such a manner that attention to one of the direct sight and the indirect sight is not interfered.

According to the exemplary configuration illustrated in FIG. 7, the display unit 101 includes only the self light emitting element of the semi-transmissive type, and the projection unit is unnecessary to simplify the configuration. Also, the projected light from the projection unit is blocked by a part of the body of the driver and the passenger, another object, or the like, and there is no concern that a part of the CMS image becomes incomplete.

Also, FIG. 8 illustrates an exemplary variant in which a display region 801 provided in a partial region of a side window 810 is divided into a plurality of regions, and a plurality of CMS images are displayed simultaneously. Specifically, the display region 801 is divided into two parts in the front-back direction, and the CMS image of the sight in the front side direction of the vehicle itself is displayed on a front display region 801-1, and the CMS image of the sight in the rear side direction of the vehicle itself is displayed on a rear display region 801-2. As an example of a configured image of display content, a cutout image of the image of the vehicle frontward area generated from the wide angle image illustrated in FIG. 3 by performing central projective transformation may be displayed on the front display region 801-1, and a legally imperative display region of the vehicle rearward area from the wide angle image illustrated in FIG. 3 may be displayed as a central projective transformation image without distortion on the rear display region 801-2.

The display region 801 composed of a plurality of CMS images of different sights can be configured as an image projected from the projection unit on the semi-transmissive reflection plate arranged in the partial region of the side window 810, as illustrated in FIG. 2 or the like. Alternatively, as described with reference to FIG. 7, the display region 801 can be configured with the self light emitting element of the semi-transmissive type such as the QLED and the OLED, and can be configured by dividing the screen into a plurality of regions and simultaneously displaying the CMS images of different sights on the respective regions.

As illustrated in FIG. 8, a plurality of CMS images of different sights are simultaneously displayed on the display region 801 provided in a part of the side window 810, and thereby the driver can confirm a wider sight by instantaneous sight line movement to the side window 810 (or the display region 801) even during traveling and paying attention to the frontward, and proceed to recognition determination.

Also, FIG. 9 illustrates yet another exemplary variant in which a display region 901 provided in a partial region of a side window 910 is divided into a plurality of regions, and a plurality of CMS images are displayed simultaneously. Specifically, the display region 901 is divided into two in the up-down direction, and a CMS image of a side sight (surround view) of the vehicle itself is displayed on an upper side display region 901-1, and the lower side is further divided into two in the front-back direction, and a CMS image of the sight in the front side direction of the vehicle itself is displayed on a front display region 901-2, and a CMS image of the sight in the rear side direction of the vehicle itself is displayed in tandem on a rear display region 901-3.

The exemplary display illustrated in FIG. 9 can also be configured with the display unit 101 composed of a combination of the semi-transmissive reflection plate arranged in the partial region of the side window and the projection unit that projects an image on this reflection plate. As a matter of course, the display unit 101 can be configured with the self light emitting element of the semi-transmissive type such as the QLED and the OLED, in the same way.

A plurality of onboard cameras of different sights may be installed on the side of the vehicle to obtain each CMS image of the frontward sight, the rearward sight, and the side sight (surround view) of the vehicle. Alternatively, it may be such that one all-sky camera is installed on the side of the vehicle (refer to FIG. 3), and the images of the frontward sight of the vehicle, the rearward sight of the vehicle, and the side sight of the vehicle are cut out from an all-sky image captured by the all-sky camera, and are mapped on the respective display regions illustrated in FIG. 8 and FIG. 9.

Note that, in the exemplary display illustrated in FIG. 9, the display magnification rate of the CMS image of the front sideward sight and the vehicle side sight (surround view) may be set small for display as compared with the CMS image of the rear sideward sight after the vehicle. The information of the front sideward sight and the vehicle side sight has a lower priority than the rear sideward sight, and thus the purpose is not to make a determination by viewing the detail but to recognize rough information such as presence or absence of an obstacle.

As illustrated in FIG. 8 and FIG. 9, in a case in which a plurality of CMS images of different sights are simultaneously displayed on one display region, a plurality of CMS images of different sights enter the same view field when the driver moves the sight line to the side window. In this case, if it takes a long time for the driver to perform information determination from individual CMS images, a serious situation can be caused. For example, it is assumed that, when overtaking is performed while traveling at a high speed without a sufficient inter-vehicle distance, sudden braking operation is performed in the frontward vehicle at a moment when the driver moves the sight line to confirm the CMS image displayed on the partial region of the side window. If it takes time until the driver recognizes the information of the CMS image and returns the sight line to the frontward, it can directly lead to the rear-end accident. That is, instantaneous determination of 1 second or less has significant meaning.

The present applicant thinks that the location relationship of the respective CMS images is extremely important to make individual information determinations in a shorter time, from the display region in which a plurality of CMS images of different sights are displayed simultaneously. As illustrated in FIG. 8 for example, it is anticipated that the driver can soon recognize the information that enters visually, by displaying the CMS image of the frontward sight of the vehicle and the CMS image of the rearward sight of the vehicle in tandem. Further, as illustrated in FIG. 9, it is anticipated that the information recognition of the driver is made quicker by combining the CMS image of the side sight of the vehicle.

Also, FIG. 10 illustrates an exemplary variant of FIG. 9. In FIG. 10, the display region 901-2 of the CMS image of the front sideward sight of the vehicle itself is explicitly and obviously separated from the display region 901-3 of the CMS image of the rear sideward sight and the display region 901-1 of the CMS image of the side sight by a boundary line having a significant line width (same as above), as illustrated with a reference number 1001.

At the time of the usual frontward traveling, the most important information obtained from the door mirror (or back reflecting mirror) is existence of an adjacent vehicle that travels in the side direction of the vehicle itself and a following vehicle that approaches from behind the vehicle itself. On the other hand, the information in the front side direction of the vehicle itself is necessary at the time of low speed steering when turning at a parking or a street corner. That is, the priority of the rear sideward sight of the vehicle itself is highest, and the priority of the side sight of the vehicle itself is second highest. There is much time to determine the information of the front sideward sight, and even if recognition is a little slower than the rear sideward sight and the vehicle side, the driver has much time for steering enough to prevent accident at the time of low speed driving.

The boundary 1001 illustrated in FIG. 10 explicitly and obviously displays the boundary between the display regions 901-1 and 901-3 of the CMS image of high priority, and the display region 901-2 of the CMS image of low priority. Thus, if the driver uses the boundary 1001 as a mark to quickly complete the information recognition of the CMS image of high priority, an accident can be prevented.

Also, FIG. 11 illustrates an additional exemplary variant of FIG. 9. In the example illustrated in FIG. 11, a display region 1101 provided in the partial region of a side window 1110 is divided into two in the front-back direction, and the front side is further divided into two in the up-down direction, and the CMS image of the front sideward sight of the vehicle itself is displayed in the front-side upper display region 1101, and the CMS image of the rear sideward sight of the vehicle itself is displayed in a front-side lower display region 1102, and the CMS image of the side sight (surround view) of the vehicle itself is displayed in a rear display region 1103. In doing so, the CMS images of the front sideward sight and the vehicle side sight may be displayed with a smaller display magnification rate than the CMS image of the rear sideward sight. The information of the front sideward sight and the vehicle side sight has a lower priority than the rear sideward sight, and thus the purpose is not to make a determination by viewing the detail but to recognize rough information such as presence or absence of an obstacle.

Also, FIG. 12 illustrates another exemplary configuration of the display unit 101. The illustrated display unit 101 is configured with a liquid crystal display (LCD) monitor 1202 capable of anisotropic display, and a semi-transmissive reflection plate 1201 arranged in a partial region of a side window 1210. The LCD monitor 1201 is arranged below a wind shield glass (front glass) 1220. The CMS image displayed on the LCD monitor 1202 is reflected by the semi-transmissive reflection plate 1201 arranged in the partial region of the side window 1210. The driver can observe the CMS image as the reflected light of the reflection plate 1202.

The LCD monitor 1201 has brightness anisotropy, and the driver is unable to directly view the display image of the LCD monitor 1202, but can observe the display image only via the reflection plate 1202 arranged in the view field direction for viewing the door mirror of the past. When the anisotropic display LCD monitor 1201 is used, other content (i.e., other than the CMS image) (for example, vehicle speed display, etc.) may be displayed in the frontward direction, that is, in the direction that the driver views directly.

Not only at the driver's seat side as described above, but also at the front passenger seat side, a LCD monitor 1202' capable of anisotropic display is arranged, and a semi-transmissive reflection plate 1201' that reflects the display image of the LCD monitor 1202' may be arranged in the side window 1210' of the front passenger seat side. Note that, even if the location position of the monitor in the front passenger seat side is generally slightly different from the door mirror of the past, there is a large distance from the viewpoint of the driver, and thus a use method may be not via the semi-transmissive reflection plate 1201' necessarily but direct visual confirmation of the LCD monitor 1202', and the configuration may be asymmetric between the driver's seat side and the front passenger seat side.

Also in the working example illustrated in FIG. 12, the configuration may be such that the display image of the LCD monitor 1202 is divided into a plurality of images, and a plurality of CMS images are simultaneously displayed on the reflection plate 1201 in the same way as the working example illustrated in FIGS. 8 to 11.

FIG. 13 illustrates an exemplary variant of the image display device 100 illustrated in FIG. 1. The image display device 100 illustrated in FIG. 13 further includes a sensor unit 104 and a display control unit 105. Also, the display unit 101 is assumed to use a reflectance variable mirror (electrochromic mirror) that can electrically control reflectance or transmittance as the reflection plate 201, or to be able to control the brightness and contrast of the CMS image projected from the projection unit 202 and the illumination light strength of the backlight. Then, the display control unit 105 controls the reflectance of the reflection plate 201 in the display unit 101, and the brightness, the contrast, or the like of the CMS image projected from the projection unit 202, on the basis of the detection result by the sensor unit 104. Note that, when the display unit 101 is configured with the self light emitting element as illustrated in FIG. 7, the display control unit 105 adjusts at least one of the brightness and contrast of the self light emitting element or the reflectance of the semi-transmissive reflection plate, on the basis of the detection result by the sensor unit 104. In the following, display control based on the detection result by the sensor unit 104 will be illustrated.

(1) Display Control According to External Light and Environment Light

The sensor unit 104 is equipped with an illuminance sensor, and detects external light and environment light. Then, the display control unit 105 controls at least one switching of the reflectance of the reflection plate 201 in the display unit 101, the brightness and the contrast of the CMS image projected from the projection unit 202, and the reflectance of the semi-transmissive reflection plate, according to the strength of the external light and the environment light detected by the sensor unit 104, in such a manner that the brightness of the outside in the direct sight through the side window viewed by the driver is not made different from the brightness of the image displayed on the side window. For example, when the external light and the environment light are intense, the reflectance of the reflection plate 201 is set higher than a usual set value to increase the brightness of the reflected light, and the brightness and the contrast of the CMS image are set higher than usual set values, in order to improve the visibility of the CMS image. That is, the reflectance of the reflection plate 201 and the brightness of the CMS image are adjusted according to the object illumination intensity in the region of the direct sight, and thereby the balance is made in such a manner that attention to one of the direct sight or the indirect sight is not interfered.

(2) Display Control According to Surrounding Environment and Driving Environment The sensor unit 104 detects the surrounding environment and the driving environment of the vehicle, and the display control unit 105 controls at least one of the reflectance of the reflection plate 201 in the display unit 101, the brightness and the contrast of the CMS image, the reflectance of the semi-transmissive reflection plate, and the like, on the basis of the detection result. Although the exemplary variant that displays the CMS image has been illustrated in FIGS. 8 to 11, the standard display image corresponding to the door mirror (or the side mirror) at the time of usual traveling and the display image for supporting parking during low speed traveling, may be switched according to the intention of the driver.

For example, the sensor unit 104 detects the surrounding environment and the driving environment on the basis of analysis such as image recognition of the captured image of the onboard camera, an analysis result of sound acquired by a sound collection device such as a microphone, and the like. Further, the sensor unit 104 may detect the driving environment of the road that is currently traveled, by utilizing a real-time distribution system of road traffic information, such as vehicle information and communication system (VICS) (registered trademark).

For example, when the sensor unit 104 detects that the following vehicle is approaching on the basis of the image analysis of the onboard camera or the like, the driver is to confirm the rearward indirect sight by the CMS image, and thus the reflectance of the reflection plate 201 and the brightness and the contrast of the CMS image are set higher than the usual set values, in order to improve the visibility of the CMS image.

Also, when the sensor unit 104 determines that an urgent vehicle is approaching on the basis of the detection result of siren sound or detects that an accident has occurred near the vehicle itself on the basis of the image analysis of the onboard camera, the reception information from outside vehicle such as VICS (registered trademark), and the like, the display control unit 105 sets the reflectance of the reflection plate 201 and the brightness and the contrast of the CMS image higher than the usual set values, in order for the driver to easily confirm the indirect sight.

(3) Display Control According to Vehicle Speed

For example, the sensor unit 104 includes a gyro sensor that detects an angular velocity of axial rotation motion of the vehicle body, an acceleration sensor that detects an acceleration of the vehicle, a sensor for detecting an engine speed or a wheel rotation speed, and the like, and detects a traveling speed of the vehicle.

In high speed traveling, such as when the vehicle travels on a high speed road for example, it becomes more necessary for the driver to confirm the rearward indirect sight by the CMS image. Thus, the display control unit 105 may control the reflectance of the reflection plate 201 and the brightness and the contrast of the CMS image, according to the vehicle speed detected by the sensor unit 104. For example, the reflectance of the reflection plate 201 is set higher than the usual set value to increase the brightness of the reflected light, and the brightness and the contrast of the CMS image are set higher than the usual set values in response to the driver performing directional indicator operation for lane change, or the sight line of the driver starting the transition for confirming of diagonally rearward, during the high speed traveling of the vehicle, in order to improve the visibility of the CMS image. The brightness increase and the contrast increase of the monitor are already performed in the driver's sight line movement start period, to gain an effect of causing the sight line movement to the target spot more immediately by human visual recognition characteristics that leads attention to a place of large temporal brightness change in the peripheral view field. That is, when the sight line movement starts, the brightness change of the object increases according to the movement of the eyeballs, by increasing the contrast of the CMS image, thereby enabling earlier recognition.

(4) Display Control According to Driving Operation

For example, the driver is to confirm the diagonally left or right rearward of the vehicle, when the vehicle turns right or left. The sensor unit 104 can detect that the vehicle is going to turn left or right, on the basis of the operation of the directional indicator, the steering angle of a steering, and the like. Then, the display control unit 105 sets the reflectance of the reflection plate 201 higher than the usual set value to increase the brightness of the reflected light, or sets the brightness and the contrast of the CMS image higher than the usual set values, in response to the sensor unit 104 having detected turning right or left of the vehicle itself, in order to improve the visibility of the CMS image. When usual straight driving is continued, the vehicle rearward is not to be confirmed unlike at the time of lane change and turning right or left, and thus it is not urgent for the driver to understand the situation as appropriate. Thus, in a situation where it is not urgent to observe the rearward image, the brightness and the contrast of the CMS image are set low to lowly suppress the visual stimulation to the peripheral view field of the driver, and when the driving operation for turning right or left or the lane change is performed, and the necessity to visually confirm the rearward image is imminent, the brightness and the contrast of the CMS image is increased to make it easier for the driver to perceive the sight line turning destination target at the time of visual recognition. As a result, there is an effect of helping driver's early rearward confirmation, contributing to prompt vehicle surrounding area recognition. Also, in a situation where the observation of the rearward image is not urgent, such as when usual straight driving is continued, the brightness and the contrast of the CMS image are set low to reduce the electric power consumption of the vehicle.

(5) Display Control According to Intention of Driver

From ergonomic knowledge, a system that helps recognition according to intention and necessity for the driver to confirm the rearward is desired. The sensor unit 104 detects whether or not the driver has an intention to confirm the rearward indirect sight with the CMS image. Then, the display control unit 105 sets the reflectance of the reflection plate 201 higher than the usual set value, or sets the brightness and the contrast of the CMS image higher than the usual set value, in response to detection of the driver's intention of the rearward confirmation by the sensor unit 104, in order to improve the visibility of the CMS image.

The sensor unit 104 follows and tracks the motion of the head of the driver and the sight line movement of the left and right eyes. The sensor unit 104 is configured with a drive monitor camera installed in the vehicle interior of the vehicle, for example. Alternatively, a gyro sensor, an acceleration sensor, a myoelectricity sensor, or the like attached to the head of the driver can utilized as the sensor unit 104.

When the position of the head of the driver and the sight line deviate from the usual default position, the display control unit 105 actively switches the reflectance of the reflection plate 201, according to the movement amount detected by the sensor unit 104. Also, when the illumination light strength of the backlight of the projection unit 202 is controllable, and the position of the head of the driver and the sight line deviate from the usual default position, the display control unit 105 actively switches the illumination light strength of the backlight of the projection unit 202 and the brightness and the contrast of the CMS image, according to the movement amount detected by the sensor unit 104.

With regard to the detection of change from the default position, it is difficult to set a specific threshold value, due to individual variation of drivers. Thus, a system may be used in which a trigger of actual switching is switchable, by learning the feature of physical motion unique to individual drivers by using artificial intelligence, for example.

Also, the display control unit 105 may control the brightness of the CMS image projected and displayed on the reflection plate 201, according to the movement amount in the horizontal direction (i.e., to left and right) of the head detected by the sensor unit 104.

For example, when the driver moves the head to left or right to change the sight line position, it is considered as a precursory sign of the driver confirming the rearward by the CMS image. Thus, in response to the sensor unit 104 detecting the left-right movement of the head of the driver and the movement of the sight line position, the display control unit 105 sets the reflectance of the reflection plate 201 higher than the usual set value to increase the brightness of the reflected light, or sets the brightness and the contrast of the CMS image projected on the reflection plate 20 from the projection unit 202 higher than the usual set value, in order for the driver to easily view the CMS image for rearward confirmation. Also, the driver can simultaneously obtain the frontward sight in the same view field through the CMS image (or by using the gap between the front pillar and the CMS image).

Here, when the driver puts the sight line on the rearward indirect sight of the CMS image, there is large turning movement of the head and the eyeballs. During the turning, the brightness and the contrast of the CMS image is momentarily set higher than the usual set value, and thereby the driver's sight line change motion target stimulates dynamic visual acuity outside the view field, and the driver's sight line change motion to the target becomes a little more agile. That is, in response to detection of the sight line movement of the driver, the peripheral view field, which is referred to as rod, is stimulated by displaying the image whose brightness and contrast are set higher than the usual set values, and thereby the driver's sight line movement and the focal point adjustment to the CMS image becomes a little more agile, thereby speeding up the recognition sequence of the CMS image. Further, by setting the brightness and the contrast of the CMS image higher than the usual set values, there is an effect that the focal point of the eyes of the driver immediately starts being shifted from infinity to a finite length position of the CMS image (the reflection plate 201 that displays the CMS image, or a hollow image defined by the combiner).

On the other hand, if the CMS image is displayed in the peripheral view field at all times, the driver gets used to the change of the CMS image in terms of attention degree, decreasing the attentiveness. During the usual frontward visual confirmation steering, the surrounding image information by the bright luminous body, as displayed by the CMS image, has little meaningful information in view of safety traveling, but is even interference. Thus, while the driver does not move the head to left or right or does not change the sight line position during usual steering, the sensor unit 104 does not detect the left-right movement of the head of the driver and the movement of the sight line position for a certain period, and therefore the display control unit 105 assumes that there is no precursory sign of the driver confirming the rearward with the CMS image, and sets the reflectance of the reflection plate 201 lower than the usual set value, or sets the brightness and the contrast of the CMS image projected on the reflection plate 20 from the projection unit 202 lower than the usual set values. Thereby, the decrease of the attentiveness of the driver is prevented. Also, the driver can obtain the direct sight to the frontward, without being interfered by the brightness of the CMS image.

In addition, an effect can be expected in which unnecessary eye fatigue and optic nerve fatigue are mitigated by decreasing the brightness of the CMS image, while the driver does not view the CMS image. Also, electric power consumption can be reduced by reducing the illumination light strength of the backlight of the projection unit 202.

(6) Display Control for Increasing Recognition Speed of CMS Image

From the necessity of immediately feeding the information of the vehicle diagonally rearward back to the driver at a necessary timing, it is ideal that the image display device 100 promptly perceives the visual confirmation motion of the CMS image in response to the intention of the driver and assists the driver in quickly performing brain recognition work.

In fact, the driver's thought is unable to be directly confirmed, and therefore as described above the recognition speed of the CMS image is decided depending on whether the feature of the movement of the head and the sight line of the driver is immediately detected to allow the sight line to promptly move to and the focal point to be adjusted to the CMS image at the time of motion start in order to start the recognition. It is effective if peripheral view field perception of a person is used to utilize living-body surrounding-area danger detection ability for setting the center sight line at the spot that changes more brightly. To do that, in response to detection of the movement of the head and the sight line of the driver, the brightness and the contrast of the CMS image may be set higher than the usual set values, to stimulate the peripheral view field which is referred to as rod.

Thereafter, the brightness and the contrast of the CMS image may be set back to standard, by detecting the end of the saccade movement of the CMS image gazing (visual fixation) of the sight line. Here, the saccade motion is wiggling eyeball motion of agile, fine, stepwise, jumpy rotational acceleration and stopping at one direction, and can be an index for estimating the attention degree of the driver. Further, when entrance into a visual confirmation stable status (visual fixation) is detected, the brightness of the CMS image is set lower than the usual set value (for example, the brightness of the backlight of the projection unit 202 is set lower than the usual set value), in order to transition to the standby state.

FIG. 14 illustrates a state transition diagram in the display control unit 105. The display control unit 105 includes a standby state in which the brightness and the contrast of the display unit 101 are set low, a normal state in which the brightness and the contrast of the display unit 101 are set at the usual set values, and a brightness-contrast up state in which the brightness and the contrast of the display unit 101 are set higher than the usual set values momentarily.

When the vehicle travels at a low speed and the position and the sight line of the head of the driver are at usual default positions, the display control unit 105 waits in the standby state. In the standby state, the illumination light of the backlight of the projection unit 202 is reduced lowly, in a state of low electric power consumption, for example.

When the position of the head and the sight line of the driver deviate from the usual default position, the display control unit 105 becomes the normal state, or the up state of the brightness and the contrast, to increase the brightness and the contrast of the display unit 101, thereby making it easy to confirm the rearward indirect sight by the CMS image.

Also, when the vehicle turns right or left, and when the urgent vehicle approaches, the display control unit 105 becomes the normal state or the up state of the brightness and the contrast, to increase the brightness and the contrast of the display unit 101, thereby making it easy to confirm the rearward indirect sight by the CMS image.

Also, in the up state of the brightness and the contrast, the brightness and the contrast of the CMS image are set higher than the usual set values momentarily, and thereby the dynamic visual acuity with the driver's sight line change motion target outside the view field is stimulated. Thereby, the driver's sight line movement and the focal point adjustment to the CMS image of become a little more agile by stimulating the peripheral view field which is referred to as rod, speeding up the recognition sequence of the CMS image. Further, there is an effect of starting setting the focal point of the eyes of the driver from infinity to the finite length position of the CMS image (displayed by reflection plate 201) immediately, by setting the brightness and the contrast of the CMS image higher than the usual set values.

Although the up state of the brightness and the contrast assists in the driver's sight line movement and the focal point adjustment to the CMS image, there is a problem that the electric power consumption in the display unit 101 increases. Thus, the display control unit 105 detects that the saccade movement of the sight line gazing the CMS image has ended, and changes the brightness and the contrast of the CMS image to the normal state, achieving low electric power consumption.

The up state of the brightness and the contrast is not continued and is changed to the normal state in which the brightness and the contrast are reduced a little, and thereby the brightness of the CMS image is decreased, to have an expected effect of mitigating the unnecessary eye fatigue and the optic nerve fatigue.

The saccade motion is wiggling eyeball motion of agile, fine, stepwise, jumpy rotational acceleration and stopping at one direction, and can be an index for estimating the attention degree of the driver. When the saccade motion of the eyeball of the driver is difficult to detect, the display control unit 105 may continue the up state of the brightness and the contrast for a predetermined time and then transition to the normal state automatically.

Thereafter, when entrance into the visual confirmation stable status is detected, the brightness of the CMS image is set lower than the usual set value (for example, the brightness of the backlight of the projection unit 202 is set lower than the usual set value), causing transition to the standby state. It is assumed that the driver determines whether or not the lane change is possible upon turning the head and then proceeds to the confirmation at the time of starting the execution of the lane change, except for the driver's reflective urgent lane change that can occur when trying to preventing a rear-end collision. The brightness and the contrast of the CMS image are increased at an initial sight line movement to speed up visual confirmation, in order to help the start of the surrounding area the recognition sequence of the driver (the brightness-contrast up state of FIG. 14). It is assumed that the driver confirms the CMS image a plurality of times until the end of target steering, and this period corresponds to the normal state of FIG. 14. Thus, it is desirable that the transition to the standby state in which the CMS image has low brightness be performed after a predetermined time when instantaneous confirmation of the CMS image becomes unimportant after the end of a series of these motions. A predetermined time mentioned here is a period in consideration of this sequence, and desirably has a unit of several seconds at the minimum, and if there is no other harmful effect, has a unit of several ten seconds.

FIG. 15 illustrates an exemplary variant of the image display device 100 illustrated in FIG. 13. The image display device 100 illustrated in FIG. 15 is equipped with an input unit 106 in addition to the sensor unit 104, the display control unit 105.

The display unit 101 is assumed to use a reflectance variable mirror (electrochromic mirror) that can electrically control reflectance or transmittance as the reflection plate 201, or to be able to control the brightness and contrast of the CMS image projected from the projection unit 202 and the illumination light strength of the backlight. Then, the display control unit 105 controls the reflectance of the reflection plate 201 in the display unit 101, and the brightness, the contrast, or the like of the CMS image projected from the projection unit 202, on the basis of the detection result by the sensor unit 104. Note that, when the display unit 101 is configured with the self light emitting element as illustrated in FIG. 7, the display control unit 105 adjusts the brightness and the contrast of the self light emitting element, on the basis of the detection result by the sensor unit 104.

The display control unit 105 controls the brightness and the contrast of the CMS image displayed by the display unit 101, as illustrated in the above (1) to (6), on the basis of the detection result by the sensor unit 104.

Further, the display control unit 105 actively switches the reflectance of the reflection plate 201, according to an instruction from the driver via the input unit 106, and actively switches the illumination light strength of the backlight of the projection unit 202 and the brightness and the contrast of the CMS image.

For example, when the CMS image displayed at a part of the side window is to be confirmed but is unable to be viewed due to influence such as external light and environment light and other causes, the driver instructs setting the brightness and the contrast of the CMS image higher than the usual set values, via the input unit 106.

Also, when the driver tries to confirm the vehicle front sideward sight through the side window, and the indirect sight of the CMS image interferes, or the brightness and the contrast of the CMS image are too high to cause the driver to feel eye fatigue and optic nerve fatigue, the driver instructs setting the brightness and the contrast of the CMS image lower than the usual set values, via the input unit 106.

Note that, even when the instruction is issued via the input unit 106 from the driver, the display control unit 105 may prohibit the switch of the brightness and the contrast of the CMS image (does not switch according to the instruction), depending on the detection result of the sensor unit 104. For example, while the vehicle is traveling at a high speed, the rearward indirect sight by the CMS image is to be confirmed at all times, and thus even if instructed from the driver to set the brightness and the contrast of the CMS image lower than the usual set values via the input unit 106, the display control unit 105 does not switch the brightness and the contrast, or keeps the brightness and the contrast at the minimum level necessary for ensuring the visual confirmation for safety.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

The technology disclosed in the present specification can be applicable to various vehicles such as a car (including a gasoline car and a diesel car), an electric vehicle, a hybrid electric vehicle, a motorcycle, a bicycle, a personal mobility, and a moving object of a form other than the vehicles that travel on a road.

Essentially, the technology disclosed in this specification has been described by way of example, and the stated content of this specification should not be interpreted as being limiting. The spirit of the technology disclosed in this specification should be determined in consideration of the claims.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image display device including:
a display unit configured to display an image on a side window of a vehicle; and
a control unit configured to control an opening and closing motion of the side window, according to a display state of the display unit.

(2) The image display device according to (1), wherein
while the display unit is displaying the image, the control unit prohibits an opening operation of the side window, or closes the open side window.

(3) The image display device according to (1), wherein
the display unit displays the image in a partial region away from a pillar of the vehicle.

(4) The image display device according to (1), wherein
the display unit displays an image having left-right parallax.

(5) The image display device according to (1), wherein
the display unit includes a semi-transmissive reflection plate arranged in a partial region of the side window, and a projection unit that projects the image on the reflection plate.

(6) The image display device according to (5) including:
the reflection plate with a vertical grid reflection mirror surface region.

(7) The image display device according to (5), wherein
the vertical grid reflection mirror surface region is formed in such a manner that a grid interval and a proportion of mirror surface become smaller when getting closer to a periphery of the side window.

(8) The image display device according to (5), wherein
the projection unit is installed near an instrument panel cluster of the vehicle.

(9) The image display device according to (5), wherein
the projection unit is located at a door of the vehicle, and projects an image toward the reflection plate arranged in the side window.

(10) The image display device according to (9), wherein
the reflection plate anisotropically retroreflects projected light from the projection unit.

(11) The image display device according to (5), wherein
the projection unit is installed at a head position at a vicinity of an eyeball position of a driver of the vehicle.

(12) The image display device according to (11), wherein
the reflection plate is made of any of retroreflection beads or film, and a translucent film to which corner cube is transferred.

(13) The image display device according to (1), wherein
the display unit includes a self light emitting element arranged in a partial region of the side window.

(14) The image display device according to (1), wherein
the display unit includes a monitor capable of anisotropic display and a semi-transmissive reflection plate arranged in a partial region of the side window.

(15) The image display device according to (1), wherein
the display unit displays the image with a boundary line.

(16) The image display device according to (1), wherein
the display unit divides a display region into a plurality of regions, and simultaneously displays a plurality of images.

(17) The image display device according to (16), wherein
the display unit simultaneously displays a plurality of images of different sights captured by an onboard camera of the vehicle.

(18)
The image display device according to (16), wherein
the display unit displays an image of a front sideward sight of the vehicle and an image of a rear sideward sight side-by-side.

(19) The image display device according to (18), wherein
the display unit further displays an image of a side sight of the vehicle.

(20) The image display device according to (18), wherein
the display unit displays the front sideward sight image at a smaller display magnification rate than the rear sideward sight image.

(21) The image display device according to (16), wherein
the display unit puts a boundary line between images displayed simultaneously.

(22) The image display device according to (1), further including:
a sensor unit; and
a display control unit configured to control at least one of brightness and contrast of the image displayed by the display unit and a reflectance of a semi-transmissive reflection plate, on the basis of a detection result of the sensor unit.

(23) The image display device according to (22), wherein
the display unit includes a reflectance variable mirror arranged in a partial region of the side window, and a projection unit that projects the image on the reflectance variable mirror, and
the display control unit controls the reflectance of the reflectance variable mirror on the basis of a detection result of the sensor unit.

(24) The image display device according to (22), wherein
the display control unit controls at least one of the brightness and the contrast of the image and the reflectance of the semi-transmissive reflection plate, according to an external light or an environment light detected by the sensor unit.

(25) The image display device according to (22), wherein
the display control unit controls at least one of the brightness and the contrast of the image and the reflectance of the semi-transmissive reflection plate, according to a driving environment of the vehicle detected by the sensor unit.

(26) The image display device according to (22), wherein
the display control unit controls at least one of the brightness and the contrast of the image and the reflectance of the semi-transmissive reflection plate, in response to driving operation of the vehicle detected by the sensor unit.

(27) The image display device according to (22), wherein
the display control unit controls at least one of the brightness and the contrast of the image and the reflectance of the semi-transmissive reflection plate, in response to the sensor unit detecting a head motion or a sight line movement of a head of a driver of the vehicle.

(28) The image display device according to (22), wherein the display control unit controls at least one of the brightness and the contrast of the image and the reflectance of a semi-transmissive reflection plate, in response to the sensor unit detecting a head motion or a sight line movement of a driver of the vehicle,

(29) The image display device according to (22), wherein the display control unit sets the brightness or the contrast of the image higher than a usual set value, in response to the sensor unit detecting a head motion or a sight line movement of a driver of the vehicle.

(30) The image display device according to (22), wherein when the sensor unit does not detect a head motion or a sight line movement of a driver of the vehicle for a certain period, the display control unit sets the brightness or the contrast of the image lower than a usual set value.

(31) An image display device including:
a display unit that is provided in a side window of a vehicle, and that is configured to display an image in a partial region away from a pillar of the vehicle.

(32) An image display method including:
displaying an image on a side window of a vehicle; and
controlling an opening and closing motion of the side window, according to a display state in the displaying step.

(33) An image display method including:
displaying an image in a partial region away from a pillar of a vehicle, in a side window of the vehicle.

(34) A moving object including:
a side window configured to make an opening and closing motion;
a display unit configured to display an image on the side window; and
a control unit configured to control the opening and closing motion of the side window, according to a display state of the display unit.

(35) An apparatus, comprising:
circuitry configured to control an opening and closing motion of a window of a vehicle based on a display state of a display that is configured to display on the window an image captured by a camera mounted on the vehicle.

(36) An image display system comprising the apparatus of (35), the display, and the camera.

(37) The image display system according to (36), wherein the camera is a side-view camera mounted on a side of the vehicle, and
the display is configured to display on a side window of the vehicle the image captured by the camera.

(38) The image display system according to (37), wherein the display is configured to display the image in a partial region away from a pillar of the vehicle.

(39) The apparatus according to (35), wherein the camera is a side-view camera mounted on a side of the vehicle, and the circuitry is further configured to control the opening and closing motion of a side window of the vehicle based on the display state of the display.

(40) The apparatus according to claim (39), wherein the image captured by the side-view camera is from a rearward perspective with respect to a forward-moving direction of the vehicle.

(41) The apparatus according to (35), wherein the circuitry is further configured to limit how far the window can be opened while the display is displaying the image.

(42) The apparatus according to (35), wherein the circuitry is further configured to, if the window is open by more than a threshold amount when the image is to be displayed, close the window so that the window is open by less than the threshold amount.

(43) The image display system according to (36), wherein the display comprises a semi-transmissive reflection material disposed within a region of the window, and
a projector configured to project the image onto at least a part of the region of the window.

(44) The image display system according to (44), wherein the window is a side window of the vehicle, and the projector is supported by a door of the vehicle in which the window is disposed.

(45) The image display system according to (44), wherein the reflection material is configured and arranged within the region of the window so as to cause projected light from the projector to be reflected anisotropically.

(46) The image display system according to (44), wherein the reflection material comprises at least one of retroreflection beads, retroreflection film, or a translucent film.

(47) The image display system according to (36), wherein the display comprises a light emitting element arranged within the region of the window.

(48) The image display system according to (35), wherein the circuitry is further configured to cause the display to display the image with a boundary line.

(49) The image display system according to (35), wherein the circuitry is further configured to cause the display to divide a display region into a plurality of regions, and simultaneously display a plurality of images captured by a plurality of cameras mounted on the vehicle.

(50) The image display system according to (35), wherein the circuitry is further configured to cause the display to display an image of a front sideward view from the vehicle and an image of a rear sideward view from the vehicle side-by-side.

(51) The image display system according to claim (50), wherein
the circuitry is further configured to cause the display to display an image of a side view from the vehicle.

(52) The image display system according to (36), wherein the system further comprises a sensor, and the circuitry is further configured to control at least one of (i) brightness of the image displayed by the display, (ii) contrast of the image displayed by the display, (iii) a reflectance of a semi-transmissive reflection material disposed within a region of the window, or (iv) a display configuration of a plurality of images captured by a plurality of cameras mounted on the vehicle, on the basis of a detection result of the sensor.

(53) The image display system according to (52), wherein the sensor comprises at least one of (a) a motion sensor configured to detect a head motion or an eye motion of a driver of the vehicle, (b) a vehicle speed sensor configured to detect a traveling speed of the vehicle, or (c) an illuminance sensor configured to detect an illuminance of an environment around the vehicle.

(54) The image display system according to (52), wherein the circuitry is further configured to set the brightness or the contrast of the image higher than a usual set value, in response to the sensor detecting a head motion or a sight line movement of a driver of the vehicle.

(55) The image display system according to (54), wherein the circuitry is further configured such that, when the sensor does not detect a head motion or a sight line movement of a driver of the vehicle for a certain period, the circuitry sets the brightness or the contrast of the image lower than a usual set value.

(56) The apparatus according to (35), wherein
the circuitry is further configured to display the image on the window for a predetermined time after the vehicle is put in a powered off state.

(57) The image display system according to (36), in combination with the vehicle.

(58) An image display method comprising:
displaying an image on a window of a vehicle; and
controlling an opening and closing motion of the window, according to whether the image is being displayed.

(59) A computer-readable medium encoded with instructions that, when executed by a controller, cause the controller to perform a method comprising controlling an opening and closing motion of a window of a vehicle based on a display state of a display that is configured to display on the window an image captured by a camera mounted on the vehicle.

REFERENCE SIGNS LIST 100 image display device
101 display unit
102 control unit
103 onboard camera
104 sensor unit
105 display control unit
106 input unit
201 semi-transmissive reflection plate
202 projection unit

The invention claimed is:

1. An apparatus, comprising:
circuitry configured to:
during a period in which a display is displaying a combined image showing a front sideward sight of a vehicle in a first region, a rear sideward sight of the vehicle in a second region, a side sight of the vehicle in a third region, and a boundary line between at least two of the regions, wherein the boundary line has a view angle of 0.028 degrees or more, wherein the combined image is captured by at least one camera mounted on the vehicle,
prohibit opening motion of a window of the vehicle based on the displaying of the image captured by the at least one camera mounted on the vehicle.

2. An image display system comprising the apparatus of claim 1, the display, and the at least one camera.

3. The image display system according to claim 2, wherein:
the at least one camera comprises a side-view camera mounted on a side of the vehicle; and
the display is configured to display on a side window of the vehicle the combined image captured by the camera.

4. The image display system according to claim 3, wherein the display is configured to display the combined image in a partial region away from a pillar of the vehicle.

5. The apparatus according to claim 1, wherein the at least one camera is a side-view camera mounted on a side of the vehicle, and the circuitry is further configured to control the opening and closing motion of a side window of the vehicle based on the display state of the display.

6. The apparatus according to claim 5, wherein the combined image captured by the side-view camera is from a rearward perspective with respect to a forward-moving direction of the vehicle.

7. The apparatus according to claim 1, wherein the circuitry is further configured to limit how far the window can be opened while the display is displaying the combined image.

8. The apparatus according to claim 1, wherein the circuitry is further configured to, if the window is open by more than a threshold amount when the combined image is to be displayed, close the window so that the window is open by less than the threshold amount.

9. The image display system according to claim 2, wherein the display comprises:
a semi-transmissive reflection material disposed within a region of the window, and
a projector configured to project the combined image onto at least a part of the region of the window.

10. The image display system according to claim 9, wherein the window is a side window of the vehicle, and the projector is supported by a door of the vehicle in which the window is disposed.

11. The image display system according to claim 9, wherein the reflection material is configured and arranged within the region of the window so as to cause projected light from the projector to be reflected anisotropically.

12. The image display system according to claim 9, wherein the reflection material comprises at least one of retroreflection beads, retroreflection film, or a translucent film.

13. The image display system according to claim 2, wherein the display comprises a light emitting element arranged within the region of the window.

14. The image display system according to claim 1, wherein the circuitry is further configured to cause the display to display the combined image with a boundary line.

15. The image display system according to claim 1, wherein the circuitry is further configured to cause the display to display an image of a front sideward view from the vehicle and an image of a rear sideward view from the vehicle side-by-side.

16. The image display system according to claim 15, wherein the circuitry is further configured to cause the display to display an image of a side view from the vehicle.

17. The image display system according to claim 2, wherein:
the system further comprises a sensor; and
the circuitry is further configured to control at least one of (i) brightness of the combined image displayed by the display, (ii) contrast of the combined image displayed by the display, (iii) a reflectance of a semi-transmissive reflection material disposed within a region of the window, or (iv) a display configuration of a plurality of images captured by a plurality of cameras mounted on the vehicle, on the basis of a detection result of the sensor.

18. The image display system according to claim 17, wherein the sensor comprises at least one of (a) a motion sensor configured to detect a head motion or an eye motion of a driver of the vehicle, (b) a vehicle speed sensor configured to detect a traveling speed of the vehicle, or (c) an illuminance sensor configured to detect an illuminance of an environment around the vehicle.

19. The image display system according to claim 17, wherein the circuitry is further configured to set the brightness or the contrast of the combined image higher than a usual set value, in response to the sensor detecting a head motion or a sight line movement of a driver of the vehicle.

20. The image display system according to claim 19, wherein the circuitry is further configured such that, when the sensor does not detect a head motion or a sight line movement of a driver of the vehicle for a certain period, the circuitry sets the brightness or the contrast of the combined image lower than a usual set value.

21. The apparatus according to claim 1, wherein the circuitry is further configured to close the window during the period in which the display is displaying the combined image.

22. The image display system according to claim 2, in combination with the vehicle.

23. An image display method comprising:
displaying a combined image showing a front sideward sight of a vehicle in a first region, a rear sideward sight of the vehicle in a second region, a side sight of the vehicle in a third region, and a boundary line between at least two of the regions, wherein the boundary line has a view angle of 0.028 degrees or more, wherein the combined image is captured by at least one camera mounted on the vehicle on a window of the vehicle; and during a period in which the combined image is displayed on the window, prohibiting opening motion of the window based on the displaying of the combined image.

24. A computer-readable medium encoded with instructions that, when executed by a controller, cause the controller to perform a method comprising:
during a period in which a display is displaying image a combined image showing a front sideward sight of a vehicle in a first region, a rear sideward sight of the vehicle in a second region, a side sight of the vehicle in a third region, and a boundary line between at least two of the regions, wherein the boundary line has a view angle of 0.028 degrees or more, wherein the combined image is captured by at least one camera mounted on the vehicle,
prohibiting opening motion of a window of the vehicle based on the displaying of the combined image captured by the at least one camera mounted on the vehicle.

* * * * *